(12) United States Patent
Bryson et al.

(10) Patent No.: US 12,471,607 B2
(45) Date of Patent: *Nov. 18, 2025

(54) PROCESS FOR PRODUCING COOKABLE, FIBROUS MEAT ANALOGS VIA DIRECTIONAL FREEZING

(71) Applicant: NEW SCHOOL FOODS INC., Toronto (CA)

(72) Inventors: Christopher Bryson, Toronto (CA); Derick Rousseau, Brampton (CA); Auke De Vries, Toronto (CA); Christopher Mark Gregson, Princeton, NJ (US); Raphael De Henau, Toronto (CA)

(73) Assignee: NSTX INDUSTRIES INC., Toronto (CA)

( * ) Notice: Subject to any disclaimer, the term of this patent is extended or adjusted under 35 U.S.C. 154(b) by 956 days.

This patent is subject to a terminal disclaimer.

(21) Appl. No.: 17/666,930

(22) Filed: Feb. 8, 2022

(65) Prior Publication Data

US 2022/0369666 A1    Nov. 24, 2022

Related U.S. Application Data

(63) Continuation-in-part of application No. 17/326,567, filed on May 21, 2021, now Pat. No. 11,241,024.

(51) Int. Cl.
*A23J 3/22* (2006.01)
*A23J 3/14* (2006.01)
(Continued)

(52) U.S. Cl.
CPC ............. *A23J 3/227* (2013.01); *A23J 3/14* (2013.01); *A23L 29/256* (2016.08); *A23J 3/24* (2013.01)

(58) Field of Classification Search
None
See application file for complete search history.

(56) References Cited

U.S. PATENT DOCUMENTS

| | | |
|---|---|---|
| 3,870,808 A | 3/1975 | Boyer et al. |
| 4,001,459 A | 1/1977 | Kim et al. |
| (Continued) | | |

FOREIGN PATENT DOCUMENTS

| | | |
|---|---|---|
| AU | 2018242124 A1 | 8/2019 |
| CA | 1038224 A1 | 9/1978 |
| (Continued) | | |

OTHER PUBLICATIONS

Kappos: Tips for Streamlining Prosecution; "Director's Blog" of Jun. 28, 2010. (Year: 2010).*

(Continued)

*Primary Examiner* — Patricia A George
(74) *Attorney, Agent, or Firm* — NORTON ROSE FULBRIGHT CANADA LLP

(57) ABSTRACT

The present disclosure provides a process for producing "cookable", fibrous meat analogs employing directional freezing. The process includes subjecting an ingestible hydrocolloid to directional freezing for inducing formation of elongated ice crystals in which the elongated ice crystals are aligned in a given direction in the directionally frozen hydrocolloid. Following this, elongated ice crystals are removed and are replaced by proteins and any other additives such as supplements which are located in the aligned channels originally containing the aligned ice crystals. Once the desired amount of protein loading is achieved, the protein-loaded hydrocolloid is subjected to conditions suitable to induce gelling of some of proteins to form protein gels in the aligned elongated channels.

69 Claims, 13 Drawing Sheets
(9 of 13 Drawing Sheet(s) Filed in Color)

Cross section

(51) Int. Cl.
*A23J 3/24* (2006.01)
*A23L 29/256* (2016.01)

(56) References Cited

U.S. PATENT DOCUMENTS

| | | | |
|---|---|---|---|
| 4,084,017 | A | 4/1978 | Kim et al. |
| 4,087,566 | A | 5/1978 | Kim et al. |
| 4,197,323 | A | 4/1980 | Cerise et al. |
| 4,423,083 | A * | 12/1983 | Shenouda .............. A23J 3/24 |
| | | | 426/802 |
| 4,810,514 | A | 3/1989 | Guenther |
| 4,852,477 | A | 8/1989 | Schubring et al. |
| 4,868,002 | A | 9/1989 | Scaglione et al. |
| 5,731,029 | A | 3/1998 | Karwowski et al. |
| 6,319,539 | B1 | 11/2001 | Shemer et al. |
| 8,985,993 | B2 | 3/2015 | Wolff |
| 9,526,267 | B2 | 12/2016 | Anderson et al. |
| 11,241,024 | B1 | 2/2022 | Bryson et al. |
| 2011/0305812 | A1 | 12/2011 | Fujiwara |
| 2019/0261655 | A1 | 8/2019 | Lee |
| 2022/0330575 | A1 | 10/2022 | Boulet-Audet et al. |

FOREIGN PATENT DOCUMENTS

| | | |
|---|---|---|
| CA | 1160892 A | 1/1984 |
| WO | 2012070962 A2 | 5/2012 |
| WO | 2023006916 A1 | 2/2023 |

OTHER PUBLICATIONS

Wild: Reference Module in Food Science, copyright 2016. (Year: 2016).*

Takamura, H. et al., "Development of Novel Meat Analogue Based on the Microstructure Control of Soybean Proteins". Japan Journal of Food Engineering, Mar. 15, 2022 (Mar. 15, 2022), vol. 23 (2022) Issue 1, pp. 35-44.

* cited by examiner

PROCESS FOR PRODUCING COOKABLE, FIBROUS MEAT ANALOGS VIA DIRECTIONAL FREEZING

CROSS-REFERENCE TO RELATED APPLICATION

This application is Continuation-in-Part US patent application of U.S. patent application Ser. No. 17/326,567, filed on May 21, 2021 which is incorporated herein by reference in its entirety.

FIELD

The present disclosure relates to a process for producing "cookable", fibrous meat analogs using directional freezing of hydrogels.

BACKGROUND

The $1.4 T global meat sector is experiencing unprecedented disruption due to the growth of plant-based alternatives, projected to be worth US $140B in the next 10 years (nearly 10% of the global meat market). Plant-based substitutes for meat and fish are coming into demand by many consumers who wrestle with the ethical issues of eating animal-based protein products; such as vegans; vegetarians and the lke. Consumers with various food allergies to meat or fish also are looking for plant-based alternatives. The growth of this industry is expected to continue for decades to come; the global meat industry would need to grow by 69% by 2050 to meet population growth. This will be especially challenging given that animal-based protein is significantly more resource-intensive to produce in teems of water usage, land usage, and GHG emissions compared to plant-based protein. Moreover, 90% of the planet's wild fish species are already classified as overfished or harvested at maximal capacity. This means that the opportunity for plant-based foods will only increase over time, driven by mounting pressure from customers, special interest groups/NGOs, and governments. Due to the increased strain on the planet's resources, from a food security point of view, having a ready alternative to animal-based protein food products is in every countries' best interest.

Another impetus for transitioning from animal-based protein to plant-based protein alternatives is being driven by the increasing outbreaks of animal diseases which are known to jump to humans. These are referred to zoonotic diseases (or zoonoses) which are caused by germs that jump from animals to humans and are particularly problematic in those parts of the world where poor farming practises lead to close contact between animals and humans. There are two modalities for the infection of humans by animals, the most common being viral infection between the humans in close contact with the animals due to airborne spread of viruses from animal to humans, and the other is due to ingestion and consumption of the animals by humans. The impact of these diseases on the economies of countries relying heavily upon animal-based agriculture can be devastating, let alone the human toll when these animal-based diseases start transmitting to humans.

Probably the most notable of these diseases passed on to humans by consuming beef meat is Bovine Spongiform Encephalopathy (BSE) which was first identified in cattle in 1985 in the UK. It was linked to variant Creutzfeldt-Jakob disease in humans and it was the consumption of infected meat that caused transmission to humans. Nearly two hundred (200) people in the UK died of this disease and led to the culling of millions of cattle. BSE is a neurological disorder caused by a rare transmissible agent called a prion, and began appearing in cattle in the 1970s. The main cause was identified as animal feed including meat and bone meal (MBM) from rendered or infected cows. More than 100,000 cattle were confirmed infected. The use of MBM was banned in 1988, but was linked to a rare illness called Creutzfeldt-Jakob disease (CJD) in humans. The BSE-linked version was named variant CJD and could manifest in a consumer of the infected meat many years after eating the infected meat, was in a number of cases fatal.

Similarly, humans ingesting fish can also lead to illness. Zoonotic diseases associated with fish contact are primarily bacterial infections. These include *Mycobacterium, Erysipelothrix, Campylobacter, Aeromonas, Vibrio, Edwardsiella, Escherichia, Salmonella, Klebsiella* and *Streptococcus iniae*. While these infections do not always make fish appear ill, they can cause serious illness in humans. The effects of global warming on a growth in zoonotic diseases in animals and fish has yet to be quantified or understood and it would not be unreasonable to believe that increasing ocean temperatures and ambient temperatures could cause more outbreaks of zoonotic diseases, Thus, there is a growing impetus to find plant-based alternatives to meat and/or fish from safer sources of protein that do not require as much resources currently required with animal-based protein sources.

Unfortunately, it has proven difficult for plant-based meat alternatives on the market today to appeal to the mass market customer because of the difficulties to adequately emulate the taste, texture, nutritional profile, and cooking behavior of real meat. These products sometimes use basic formulations and untailored processes that highlight a lack of R&D investments from the manufacturer. Consumer research has pointed out that consumers rely primarily on 3 criteria when making purchasing decisions for meat vs. alt-meat products: price, taste, and convenience. Thus, if a plant-based meat alternative does not have a comparable taste to real meat, is more expensive, and/or is less convenient to prepare, it will likely only appeal to niche vegetarian and vegan segments.

Within the alternative protein industry, almost all efforts are focused on alternatives that emulate beef, chicken and pork, with little efforts directed to alternative, plant-based seafood. Plant-based seafood accounted for only 1% of total plant-based meat alternative sales in 2019, representing only 0.07% of total seafood sales ($105M). If the plant-based seafood market can reach 10% of the total seafood market in 2030, just as the overall plant-based meat market is projected to hit 10% of global meat sales, it will be worth $20B.

There exist methods on using directional freezing as a means to produce fibers that resemble meat muscle fiber. In U.S. Pat. No. 4,423,083, a process is described to produce fibers by combining a protein and hydrocolloid followed by freezing. Upon thawing, the fibers are strengthened by a sequestering agent, preserving the fiber structure. In the process disclosed herein, the directional freezing of a hydrocolloid gel is performed first, with a second step of immersion in a protein solution without the need for a sequestering agent so that the need for a sequestering agent is avoided. This very advantageously gives the flexibility to control fiber formation prior to adding other components, such as the proteins, and other supplements as disclosed herein.

Furthermore, U.S. Pat. No. 4,423,083 discloses that it is necessary to slice the frozen mass prior to immersion in the sequestering solution to produce fiber bundles with a maximum thickness of 8 mm to preserve the fibrous character of the innermost part of the sample. In the present disclosure, there is no need for slicing, fiber structures can be preserved without a sequestering agent, and the sample can be of any size or shape.

SUMMARY

The present disclosure provides a two-step process for producing fibrous meat analogs by directional freezing of a hydrocolloid (or protein) gel. For hydrocolloid gels, in the first step the hydrocolloid gel is directionally frozen. This process induces meat or fish-like muscle fiber formation and texture change to the hydrocolloid gel due to the formation of ice crystals that align the hydrogel fibers. A soluble protein is then infused into the textured hydrogel by immersion of the hydrogel in a protein solution for a specific time at a preselected temperature so that the aligned ice crystals are replaced by the soluble protein in the textured hydrogel. Subsequent heating of the infused hydrogel induces gelation. Using a hydrocolloid with a melting temperature above the gelling temperature of the protein is preferred to maintain size, structure and fibration of the product.

The present disclosure provides a process for producing fibrous meat analogs, comprising preparing an ingestible hydrocolloid gel comprised of one or more different ingestible hydrocolloids and water; subjecting the ingestible hydrocolloid gel to directional freezing inducing formation of aligned elongated ice crystals to form a directionally frozen hydrocolloid gel with aligned elongated channels in which the aligned elongated ice crystals are located followed by replacing the aligned elongated ice crystals with ingestible proteins to produce a protein infused hydrocolloid gel, and subjecting the protein infused hydrocolloid gel to conditions suitable to gel at least some of the ingestible proteins to create a protein gel within the aligned channels to form a fibrous meat, poultry or seafood analog food product.

The present disclosure also provides a process for producing fibrous meat analogs, comprising:

subjecting an ingestible protein gel to directional freezing inducing formation of aligned elongated ice crystals to form a directionally frozen protein gel with aligned channels in which the aligned elongated ice crystals are located;

replacing the aligned elongated ice crystals with ingestible proteins to produce a protein infused protein gel; and subjecting the protein infused protein gel to conditions suitable to gel at least some of the ingestible proteins to create protein fibers in the aligned channels to form a fibrous meat analog food product.

The present disclosure provides a process for producing fibrous meat analogs, comprising:

preparing a composite ingestible gel comprised of one or more different types of ingestible hydrocolloids and one or more different types of ingestible proteins;

subjecting composite ingestible gel to directional freezing inducing formation of aligned elongated ice crystals to form a directionally frozen composite gel with aligned channels in which the aligned elongated ice crystals are located;

replacing the aligned elongated ice crystals with any one or combination of ingestible proteins, hydrocolloids and composites to produce a protein infused composite ingestible gel; and subjecting the protein infused composite ingestible gel to conditions suitable to gel at least some of the ingestible proteins to create protein fibers in the aligned channels to form a fibrous meat analog food product.

The present disclosure provides a fibrous, edible, protein-rich food analog product that can be cooked. The fibrous, edible, protein-rich food analog product comprises an ingestible protein infused hydrocolloid gel, wherein the proteins are present in a range from about 2 wt. % to about 50 wt. %, and the hydrocolloids are present in a range from about 0.2 wt. % to about 10 wt. % in the fibrous, edible, protein-rich food analog product.

The ingestible proteins may be present in a range from about 10 wt. % to about 30 wt. %, and the hydrocolloids are present in a range from about 0.5 wt. % to about 8 wt. % in the fibrous, edible, protein-rich food analog product.

The ingestible proteins may be present in a range from about 15 wt. % to about 25 wt. % and the hydrocolloid is present in a range from about 1 wt. % to about 5 wt. % in the fibrous, edible, protein-rich food analog product.

The fibrous, edible, protein-rich food analog product is any one of a fibrous mammalian meat, poultry or seafood analog food product.

The product may further comprise a skin layer formed of ingestible constituents selected to give an appearance and taste mimicking the food product being mimicked by the fibrous, edible, protein-rich food analog product.

The product has a translucent appearance and is characterized in that upon being cooked it transforms from translucent to opaque.

The present disclosure further provides a process for producing fibrous meat analogs, comprising preparing an ingestible biopolymer gel or solution or dispersion comprised of one or more ingestible proteins and/or hydrocolloids and water, then subjecting the ingestible biopolymer gel or solution or dispersion to directional freezing inducing formation of aligned elongated ice crystals to form a directionally frozen gel or solution with aligned elongated channels in which the aligned elongated ice crystals are located. The aligned elongated ice crystals are then replaced with ingestible proteins and/or hydrocolloids to produce a protein and/or hydrocolloid infused gel, and subjecting the ingestible protein and/or hydrocolloid infused gel to conditions suitable to gel at least some of the ingestible proteins and/or hydrocolloid to create protein and/or hydrocolloid gel within the aligned channels to form the fibrous meat analogs containing protein.

There is also provided a process for producing a fibrous meat analog food product, comprising:

preparing an ingestible hydrocolloid gel comprised of one or more different ingestible hydrocolloids;

subjecting the ingestible hydrocolloid gel to directional freezing inducing formation of aligned elongated ice crystals to form a directionally frozen hydrocolloid gel with aligned elongated channels in which the aligned elongated ice crystals are located;

replacing the aligned elongated ice crystals with ingestible proteins to produce a protein infused hydrocolloid gel;

exposing the protein infused hydrocolloid gel to an agent that acts to prevent leakage of the protein from the protein infused hydrocolloid gel; and packaging the fibrous meat analog food product for shipment.

The agent that acts to prevent leakage of the protein includes any one or combination of a pH modifier, salt, heat treatment, chemical crosslinking agents, enzymatic crosslinking agents, infusion of a gelling hydrocolloid, and applying a hydrocolloid coating to said protein infused hydrocolloid gel.

The step of replacing the aligned elongated ice crystals with ingestible proteins may include replacing the aligned elongated ice crystals with a mixture of ingestible proteins, tastents and colorants to give the fibrous meat analog food product an appearance and taste of a raw seafood product.

A further understanding of the functional and advantageous aspects of the present disclosure can be realized by reference to the following detailed description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will now be described, by way of example only, with reference to the drawings, in which.

DETAILED DESCRIPTION

Figure 1:
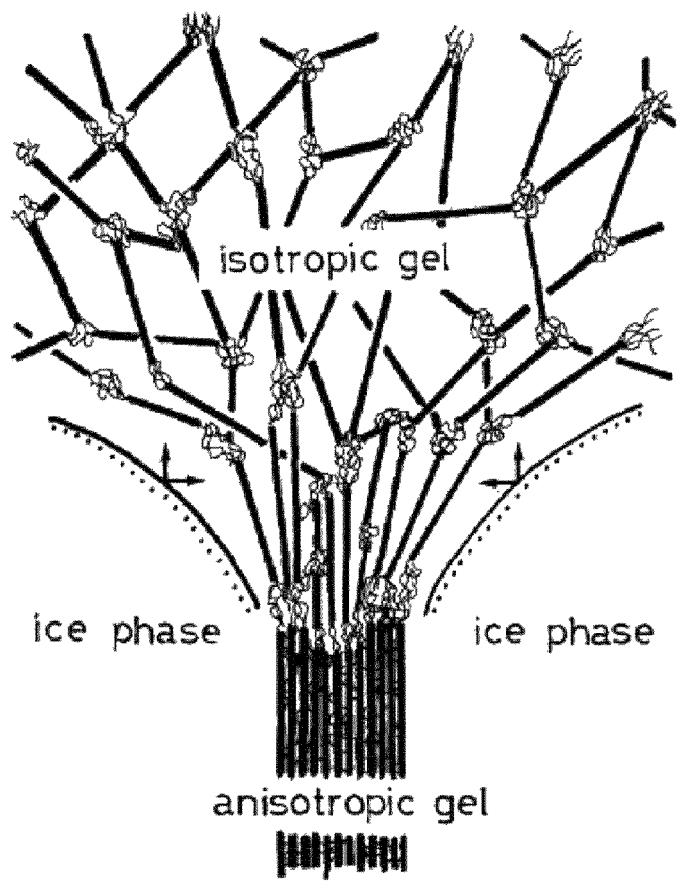
FIG. 1 shows a schematic of a isotropic hydrogel undergoing directional freezing in which the hydrogel in contact with the pre-cooled substrate begins to freeze forming ice crystals that grow in a direction perpendicular to the plane of the substrate and the growth of these aligned crystals progresses away from the cooled substrate until the entire mass exists in the form of elongated ice crystals surrounded by the now concentrated hydrogel, as disclosed in Yokoyama, F., Achife, E. C., Momoda, J., Shimamura, K. and Monobe, K., 1990. Morphology of optically anisotropic agarose hydrogel prepared by directional freezing. Colloid and Polymer Science, 268(6), pp. 552-558.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein the phrase "fibrous meat analogs" refers to food analogs that emulate food products characterized by a fibrous structure, including fish and meats (beef, lamb, pork, chicken etc.).

As used herein, the words "protein denaturing" means altering the structure of a protein from its native state. For example, this can be achieved by breaking some of the intramolecular bonds, for example hydrogen bonds, within a protein molecule. The breaking of these bonds, for example as a result of heat treatment, means that the highly ordered protein structure is altered from its natural or native state. This process may include exposure of hydrophobic side groups, normally buried in the center of the protein molecule as well as shifting or creation of intermolecular disulfide bonds. This may result in the formation of protein aggregates.

As used herein, the phrase "Protein gel" means a three dimensional viscoelastic network of proteins that immobilizes water. For example, this can be achieved by heating a protein solution above the denaturation temperature of the protein in favourable solvent conditions (e.g., ionic strength and pH) for the formation of a continuous network. Another possible route is to create a fluid suspension or dispersion of proteins or protein aggregates and, via a change in solvent condition (e.g., ionic strength or pH), a protein gel is formed due to the reduction in repulsion between the proteins or protein aggregates.

As used herein, the phrases "Protein gelling" and "Gelling of the protein" and "gelled protein" mean the process of creating a protein gel, as previously defined, for example via heat treatment of a protein solution. "Gelled protein" means a certain volume of proteins that has undergone a gelling process.

As used herein, the term "biopolymer" means organic molecules that are composed of repeating monomers and produced by living organisms, such as proteins and polysaccharides.

As used herein, the term "diameter" represents the cross-sectional width of an individual channel or fiber but doesn't necessarily imply a circular cross sectional shape.

As used herein, an elongated ice crystal refers to a phase separated ice domain with a high aspect ratio.

As used herein, the term "hydrogel" means a three dimensional network of hydrophilic biopolymers that can immobilize a large amount of water.

As used herein, the phrase "protein fiber" means an elongated protein gel with a high aspect ratio in the similar size range as muscle fibers as found in meat or fish.

As used herein, the phrase "fibrous" means contains protein fibers.

The present disclosure provides a process for producing a "cookable", fibrous meat analogs by employing directional freezing.

Directional Freezing

The process of directional freezing involves freezing a material by controlling the direction that the water freezes. The step of directional freezing of the hydrogel is conducted by placing the hydrogel of selected size and shape in contact with a pre-cooled substrate to induce ice crystal formation extending in a direction perpendicular to the pre-cooled substrate through the fibrous hydrogel structure, and wherein the pre-cooled substrate is cooled to a temperature in a range from about −2° C. to about −196° C.

Figure 2A:
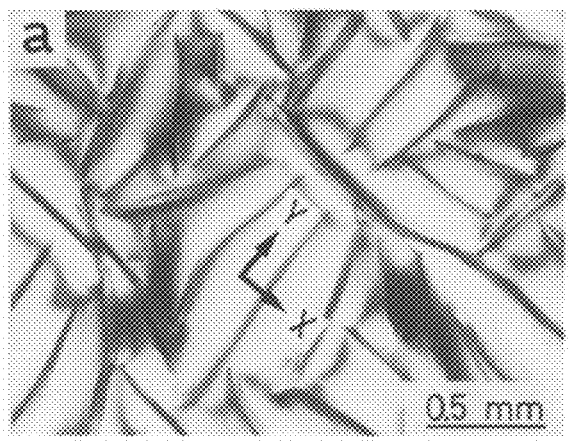
FIGS. 2A and 2B show polarized optical micrographs of 2A) transverse, and 2B) longitudinal cross sections of a directionally frozen/thawed agarose hydrogel, as disclosed in Yokoyama, F., Achife, E. C., Momoda, J., Shimamura, K. and Monobe, K., 1990. Morphology of optically anisotropic agarose hydrogel prepared by directional freezing. Colloid and Polymer Science, 268(6), pp. 552-558.
Figure 2B:
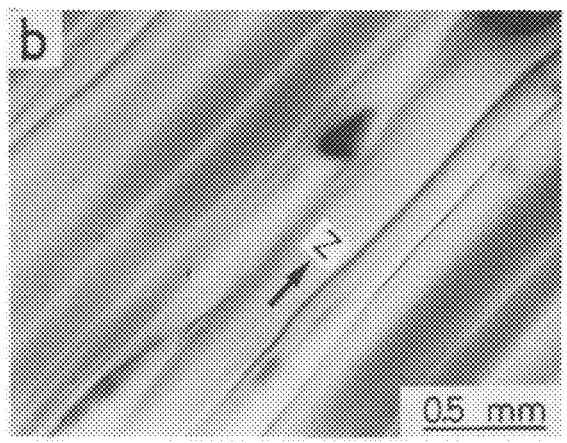

Referring to FIGS. 1 and 2A and 2B, the principal concept of directional freezing of a hydrogel is illustrated. Here, a selected mass and shape of a hydrogel is placed in contact with a cold substrate, upon which elongated ice crystals start to form, perpendicular to the freezing front. This forces the polymer chains of the hydrogel to align perpendicular to the pre-cooled substrate to form an aligned fibrous gel structure which also results in the formation of aligned anisotropic elongated ice crystals separated from each other by the aligned fibrous strands with the elongated ice crystals aligned in a given direction in to form a textured hydrogel containing aligned ice crystals. As can be seen from FIGS. 3A, 3B and 3C once the aligned, elongated ice crystals are removed or displaced from the hydrocolloid, they will leave behind aligned, elongated channels. This is a freeze-concentration effect wherein the polymer chains of hydrocolloids are pushed together into a smaller volume of higher concentration as the water and polysaccharide increasingly phase-separate from the initial solution as elongate ice crystals form.

Directional Freezing Molds

For each of the different types of fibrous meat analog food products produced, whether they be fish, poultry, pork, veal, beef and the like, a product-specific directional freezing mold may be produced. There are several variable parameters for each specific type of mold which can be varied depending on the commercial product to be sold. Specifically, the shape of each mold can be adjusted to emulate the shape of the food product being produced. For fish, the shape can reflect the shape of a whole fish, or it can reflect the shape of a fillet, not a whole fish. Salmon fillets have a distinctive shape and the molds could reflect this distinctive shape. The depth of the molds can be varied depending on the desired thickness of the final product. Similarly, numerous steak cuts have distinct features, this can be reflected in the mold, for example a T-bone steak has a characteristic "T" shaped vertebrae and the shape of the mold can be shaped to reflect this. The sizes of the molds can be made to realistically reflect typical sizes of the meat cut. As these cuts can range in thickness from sub-inches to several inches, this can be reflected in the depth of the molds.

Taking salmon as an example the mold may be of roughly the same size and shape of a salmon filet being produced, with one single substrate could be used which is molded so that when filled with the hydrogel, the final product will have roughly the same size and shape as a fillet of salmon. Alternatively, a whole fish may be produced by having a top and bottom mold sized and shaped so that when the top and bottom are connected with the hydrogel inside, the interior size and shape mimics a whole fish.

In addition to the parameters of shape, size and depth of the molds, another parameter is surface topography. For food products with distinctive surface characteristics that are not flat or planar, the mold can be produced to reflect the non-planar topography so that when packaged with the non-planar surface visible it the product appears very realistic. It will be appreciated that the molds may incorporate mechanical design features that could be incorporated into the molds to give easier control over varying the channel diameters to control fiber diameter. A non-limiting example would be to seed the nucleation of ice crystals (and therefore their number and size) by having sharp points in the inner surface of the mold. Another method could be varying the speed at which the hydrocolloid sample/mold is lowered into a cooling bath.

While a single pre-cooled plate can be used for the directional freezing process, it will be appreciated that two (2) plates could be used, one below and one on top of the hydrocolloid (or protein) mass.

Physiologically Compatible Hydrocolloids

The present process for producing cookable, fibrous meat analogs, involves directionally freezing an ingestible hydrocolloid gel or a protein gel suitable for food products. The hydrocolloid gel may be, but is not limited to polysaccharide hydrogels, regular gelatin, recombinant gelatin, or a combination of both. The hydrocolloids may be naturally occurring, they could be recombinant, or they could be lab-grown or cultivated, or they could be chemically or enzymatically modified.

There are numerous types of polysaccharide hydrogels. Non-limiting examples of such hydrogels include carrageenans which are a family of natural linear sulfated polysaccharides extracted from red edible seaweeds and which exhibit a high efficacy for binding strongly to food proteins. Carrageenans are large, highly flexible molecules that form curling helical structures which confers on them the ability to form a variety of different gels at room temperature and hence why they are widely used in the food industries in particular as stabilizing and thickening agents.

These carrageenans typically contain from about 15 wt. % to about 40 wt. % ester-sulfate content, which produces an anionic polysaccharide. They are categorized into three different classes based on their sulfate content. Kappa-carrageenan (K-carrageenan) has one sulfate group per disaccharide, iota-carrageenan (I-carrageenan) has two, while lambda-carrageenan (L-carrageenan) has three. K-carrageenan is characterized in that it forms strong and rigid gels in the presence of potassium ions, and reacts with dairy proteins, while I-carrageenan forms soft gels in the presence of calcium ions, and finally, L-carrageenan does not gel but is useful for thickening dairy products. Carrageenans are high-molecular-weight polysaccharides and mostly made up of alternating 3-linked b-D-galac-topyranose (G-units) and 4-linked a-D-galactopyranose (D-units) or 4-linked 3,6-anhydro-a-D-galactopyranose (DA-units), forming the disaccharide repeating unit of carrageenans.

Another class of ingestible hydrogels include agar hydrogels which are jelly-like substances which are obtained from red algae and is a mixture of two constituents, linear polysaccharide agarose, and a heterogeneous mixture of smaller molecules termed agaropectin. It forms the supporting structure in the cell walls of certain species of algae, and is released on boiling. These algae are Zo termed agarophytes, and belong to the rhodophyta (red algae) phylum.

Agar hydrogels have been used as a food ingredient, for example as a vegetarian substitute for gelatin, a thickener for soups, ice cream, in fruit preserves, and the like. Agar hydrogels have also been used for other physiological applications such as an appetite suppressant, and as a laxative, to mention a few. The gelling agent in agar is an unbranched polysaccharide isolated from the cell walls of various species of red algae. Those skilled in the art will know that these ingredients such as agar and carrageenan are widely used in the food industry.

Thus, non-limiting examples of the ingestible hydrocolloid gels include agar, fermentation derived gelatin, alginate, curdlan, a carrageenan selected from the group consisting of kappa-carrageenan, kappa 2-carrageenan and iota-carrageenan, furcelleran, starch (including modified starch and dextrins), Konjac glucomannan, gellan gum, as well as combinations which include xanthan gum, guar gum, locust bean gum and tara gum.

Proteins

In the present process, the proteins incorporated into the hydrocolloid or protein gel are not limited to naturally occurring proteins. For example, recombinant proteins, cultivated (lab-grown) proteins, chemically or enzymatically modified proteins may be used which are suitable for food products. The proteins can be animal proteins or recombinant animal proteins. The proteins can also be any one or combination of plant-based, bacterial-based, fungal based, and algal-based proteins. As an example, the fungal based proteins can include yeast. The algal-based proteins can be any one or combination of macro and micro algal.

Non-limiting examples of the ingestible proteins are any one, or any combination, of whey protein, soy protein, potato protein, rubisco protein, lemna protein, rice protein, almond protein, oat protein, flax seed protein, euglena protein, schizochytrium protein, mung bean protein, pea protein, recombinant whey, cultured whey, recombinant egg albumin, cultured egg albumin, recombinant gelatin or collagen, cultured gelatin or collagen, canola protein, lupin protein, fava protein, wheat protein, lentil protein, amaranth protein, peanut protein, moranga seed protein, pumpkin seed protein, chickpea protein, sunflower seed protein, safflower seed protein, mustard seed protein, chlorella protein and spirulina protein.

Whey protein isolate (WPI) is a dietary supplement as well as a food ingredient which is produced by separating components from whey. Whey protein is a mixture of proteins and some of those gel very well, whereas others in the mixture do not gel very well, if at all. Whey is a milk by-product of the cheese-making process which can be processed to yield whey protein in three different forms including whey isolate, whey concentrate and whey hydrolysate. The difference between these protein forms relates to the composition of the product, specifically the protein content. Whey isolates contain the highest amount of protein and may be lactose free, as well as carbohydrate free, fat free, and cholesterol free.

These proteins are characterized by being highly bioavailable and are absorbed into the body quickly as well as having a high concentration of branched-chain amino acids (BCAAs) that are highly concentrated in muscle tissue, and are used stimulate protein synthesis in addition to fuelling working muscles.

While the present food products include the use of WPI in the examples of the present disclosure, it will be appreciated by those skilled in the art that many other plant-based proteins that provide excellent heat gelling proteins which may be used and may be readily identified by those skilled in the art. Non-limiting examples include soy protein, potato protein isolate, rubisco protein, mung bean protein and pea protein. In order to be efficacious in respect of heat gelling, the proteins will have the following properties of solubility (>85%), viscosity (preferably low viscosity at room temperature and high at temperatures >>50° C.), denaturation temperature (about 45 to about 85° C.) and gel strength criteria (G'>100 Pascals).

The ingestible soluble protein is preferably a naturally heat gelling protein and when these are used, the ingestible polysaccharide containing hydrogel and ingestible heat gelling protein are selected such that the hydrogel has a melting temperature greater than the gelling temperature of the protein to maintain size, structure and fibration of the fibrous meat analog food product.

In some embodiments the ingestible soluble protein is an ingestible non-heat gelling protein, in which case a heat inducing trigger agent is included to trigger gelling as the temperature is raised. The trigger agent induces gelation of the otherwise non-gelling protein. The trigger agent could be pre-mixed in with either the protein or the hydrogel phase. The heat inducing trigger agent can be any one or combination of a salt, enzyme or pH modifier. For example, the salt, pH modifier or enzyme microencapsulated within a meltable coating which is triggered by heating. This microencapsulated material could be in either phase. Non-limiting examples of a pH modifier includes glucono-delta-lactone. Non-limiting examples of enzyme-based trigger agents include transglutaminase. Non-limiting examples of salt-based trigger agents include calcium phosphate.

Whether or not the protein is heat gelling or not, the protein impregnated hydrogel product is heated such that the internal temperature rises to between 50 and 100° C., inducing protein gelation. This might be done using a technique that uses much higher temperatures (oven, grill, frying pan, broiler to mention a few examples). The goal of this heating step is to produce a product that goes through a transition on heating leading to a change in color and/or texture (preferably both) similar to that with traditional fish or meat.

The solution in which the frozen (or thawed) hydrogel is immersed can contain 100% heat gelling protein only, but also a mixture of heat gelling protein and non-heat-gelling protein or protein hydrolysate. The concentration of heat gelling protein can be smaller than the total protein content. For instance, of a 15 wt. % total protein solution, 5 wt. % can be a heat-gelling protein, the remainder being non heat gelling protein. It is noted that these amounts are non-limiting.

Controlling Protein Gel Diameter

The present method allows for controlling a diameter of the aligned elongated channels by controlling the relative temperature between the cooling surface in contact with the ingestible hydrogel and surface air temperature above the surface in order to alter the speed of the directional freezing process. The diameters of the protein gel in the aligned channels will be proportional to the diameter of the aligned elongated channels. Faster freezing typically makes thinner ice crystal channels. What is controlling this is the ice crystal nucleation rate which is faster at lower temperatures. If the nucleation rate is faster, then the result is more ice nuclei (and therefore more ice crystals) so each individual ice crystal is thinner.

Ice nucleation is going to be most important in the first few seconds of the freezing process and at the colder surface where nucleation occurs. Deeper into the hydrogel these crystals are going to grow with the freezing front and ice nucleation is not likely to be so important. As a result, what controls the thickness of the crystals is the rate of nucleation at that first freezing surface, which is controlled by the amount of supercooling and in turn by the temperature and rate of temperature decrease at that freezing surface. With thinner ice crystals, once the ice crystals are displaced they leave behind commensurately thinner aligned channels which when filled with protein results in thinner protein fibers upon gelling of some of the gellable proteins.

In preferred embodiments the diameter of the aligned elongated channels are controlled to give the protein gel located in the channels a diameter in a range from about 20 to about 200 microns to give the protein gel diameters in the same range. For example, the diameter of the protein fibers in salmon is roughly 100 microns. The diameter of protein fibers in meats such as beef, chicken, pork etc. typically varies in a range from about 30-50 microns for chicken and 20-85 microns for beef.

Methods of Replacement of Elongated Ice Crystals with Proteins and Other Additives There are several methods that may be employed to replace the elongated ice crystals with proteins and/or other constituents such as flavorants, tastants, dietary supplements and the like. In one embodiment, replacing the aligned elongated ice crystals with the ingestible proteins includes thawing the directionally frozen hydrocolloid gel by immersion in a solvent containing the ingestible proteins having a temperature suitable to melt the ice crystals that are replaced by the ingestible proteins to produce the protein infused hydrocolloid gel. In this embodiment, thawing the directionally frozen hydrocolloid gel includes adjusting the temperature of the solvent containing the ingestible gellable proteins to be in a range from the melting point of water to the melting point of the hydrocolloid gel, and replacing the aligned elongated ice crystals with the ingestible proteins includes adjusting the temperature of the solvent containing the ingestible proteins to be in a range from the freezing point of the solvent containing the protein solution to a gelation onset temperature of at least one of the ingestible proteins. Typically, thawing the directionally frozen hydrocolloid gel is conducted at a temperature in a range of between about 0° C. to about 85° C. depending on the type of hydrocolloid, and similarly, replacing the aligned elongated ice crystals with ingestible proteins can be conducted at a temperature in a range of between about 0° C. to about 45° C.

The solvent containing the proteins and/or other constituents may be an aqueous solution or alternatively it may be a non-aqueous solvent suitable for food in which the ingestible proteins are soluble. The non-aqueous solvent may be any one or combination of acetic acid, formic acid, ethanol, methanol, propanol, and their mixtures with water. When the solvent is an aqueous solution in which the ingestible proteins are soluble this solution may be held at a temperature between about 1° C. to about 99° C. It may also be heated to a higher temperature in a range from between about 99° C. to about 130° C., subjected to pressures in a range from about 0 to 1.7 bar in a self pressurized closed vessel.

In another embodiment the process of replacing the aligned elongated ice crystals with ingestible proteins includes subjecting the directionally frozen hydrocolloid gel to conditions suitable for sublimating the elongated ice crystals in the presence of the ingestible gellable proteins. This can include subjecting the directionally frozen hydrocolloid gel to vacuum resulting in sublimation of the ice and immersing the sublimated hydrocolloid gel in a solution containing the ingestible proteins whereby the solution containing the ingestible proteins infuse into the sublimated hydrocolloid gel.

In another embodiment the process of replacing the aligned elongated ice crystals with ingestible proteins includes freeze drying the directionally frozen hydrocolloid gel to remove substantially all the water and then immersing the dried gel into a solution containing the ingestible proteins.

In another embodiment the process of replacing the aligned elongated ice crystals with ingestible proteins includes subjecting the directionally frozen hydrocolloid gel to conditions suitable to cause evaporation of the ice to remove substantially all the ice in the presence of a solution containing the ingestible proteins.

Thus, it will be understood that there are numerous ways to displace the ice crystals using phase changes, for example sublimation (e.g., freeze drying) or solid to liquid phase transition (melting), evaporation of the ice crystals and in addition any type of physical displacement of the ice crystals may be used.

Conditions Suitable for Producing Protein Gel in the Aligned Channels

Proteins can be classified as being gellable proteins or being non-gellable proteins. In the present method, proteins which are non-gellable can be mixed with the gellable proteins to provide increased protein content. The class of gellable proteins includes heat gellable proteins in which heating up to the gelation temperature for the particular protein results in formation of a protein gel. However, there are other ways to gel proteins hence the proteins used in the present method and food analog products are not restricted to non-heat gellable proteins.

Thus, once the proteins have been loaded into the hydrocolloid or protein gel, several methods of inducing the gellable proteins to gel may be used if the proteins are not heat gellable. In one embodiment the conditions suitable to gel at least some of the ingestible proteins may include infiltrating a salt into the protein infused hydrocolloid gel, in which the salt is selected to induce gelation of at least some of the ingestible proteins to produce the protein gel. This salt can be infiltrated into the protein infused hydrocolloid gel by injecting a salt solution into the protein infused hydrocolloid gel or protein gel.

Alternatively, the salt can be infiltrated into the protein infused gel by adding the salt to the surface of the protein infused hydrocolloid gel as a crystalline solid, which is then solubilized by any available water present in the protein infused hydrocolloid gel and diffuses into the protein infused gel.

Alternatively, the salt can be infiltrated into the protein infused gel by immersing the protein infused gel into a concentrated salt solution which diffuses into the protein infused hydrocolloid gel. The salt can be any one of sulfate, citrate, ascorbate, acetate, gluconate and phosphate salts of sodium (Na), potassium (K), calcium (Ca) and magnesium (Mg), and any combination thereof.

Another way of inducing gelation of the infused proteins includes adjusting a pH of the protein infused hydrocolloid gel to a value suitable to cause gelation of said at least some of the ingestible proteins. The pH can be adjusted by adding a pH modifier, suitable for food, in liquid form, in solution form, or adding a soluble pH modifier in a solid form. The pH modifier can be any one or combination of acetic acid, hydrochloric acid, ascorbic acid, malic acid, formic acid, tartaric acid, citric acid, glucono-delta lactose, sodium hydroxide, potassium hydroxide, and calcium hydroxide.

Another way of inducing gelation of the infused proteins includes infiltrating a solution containing an enzyme-based crosslinking agent into the protein infused hydrocolloid gel, the enzyme-based crosslinking agent selected to induce gelation of said at least some of the ingestible proteins. The enzyme crosslinking agent may comprise any one or combination of transglutaminase, transglutaminase (EC 2.3.2.13), sortase A (EC 3.4.22.70), tyrosinase (EC 1.14.18.1), Laccase (EC 1.10.3.2), peroxidase (EC 1.11.1.x), lysyl oxidase (EC 1.4.3.13) and amine oxidase (EC 1.4.3.6).

Another way of inducing gelation of the infused proteins includes pressure treatment of the protein infused hydrocolloid gel to induce gelation of at least some of the proteins. In this method the protein infused hydrocolloid gel food products are sealed and placed into a rigid sealed compartment containing a liquid, and pressuring the liquid.

Another way of inducing gelation of the infused proteins includes infiltrating a solution containing a chemical crosslinking agent into the protein infused hydrocolloid gel, the chemical crosslinking agent selected to induce gelation of said at least some of the ingestible proteins. Non-limiting examples of the chemical crosslinking agent is any one or combination of glutaraldehyde, tannins, genipin, and liquid smoke.

Another way of inducing gelation of the infused proteins includes irradiating the protein infused hydrocolloid gel with radiation of suitable wavelength and intensity to induce crosslinking of the protein thereby inducing gelling.

It will be appreciated if mixtures of heat-gellable proteins and non-heat gellable proteins are loaded into the aligned channels of the hydrocolloid or protein gel, any combination of the above methods for gelling the gellable proteins may be used.

Thawed Directionally Frozen Hydrocolloids

In the embodiment using thawing in a solution containing protein and any other desired additives, upon thawing of the textured hydrogel in the presence of an aqueous solution or aqueous dispersion containing species, as the aligned ice crystals melt, the species diffuse into the textured product to replace the melted ice crystals. When heat gelling proteins have replaced the melted ice crystals, several scenarios, are possible as follows:

1) in the first scenario the protein infused hydrogel is heated to a temperature above the gelling temperature for a period of time so that some, but not all, of the proteins denature. This results in protein fiber formation, but enough so that leakage of the remaining proteins out of the hydrogel is avoided;
2) the second scenario is that the thawed hydrogel can be heated to above the gelling temperature for a period of time so that most if not all the proteins participate in protein fiber production;
3) the third scenario is that one does not heat to the gelling temperature so no gelling occurs, but instead there is introduced into the hydrogel an ingestible substance that acts to block leakage, wherein the protein infused hydrogel is then sealed; and
4) in a fourth scenario, the temperature may be heated up not only to a temperature at which the proteins are gelled to form the protein fibers, but the temperature may be increased further to actually cook the food analog, thereby producing a "pre-cooked" food product which is then packaged and sent to the end user and which does not need to be cooked.

The step of thawing the directionally frozen hydrogel may be conducted first, and once the ice crystals have melted and left behind the elongated aligned channels, the thawed hydrogel may then be immersed in the aqueous protein solution whereupon the proteins flow into the vacated channels.

The step of immersing the protein infiltrated textured hydrogel into the protein containing solution is done at a preselected temperature in a range from about 0° C. to about 80° C. and preferably from about 1° C. to about 7° C. and may be carried out at a typical refrigerator temperature of 4° C., with the temperature being selected so that the aligned ice crystals slowly melt and as they do the proteins, and any other additional constituents diffuse in and replace the melting ice crystals if the thawing and infiltration steps are performed simultaneously by immersing the directionally frozen hydrogel into the liquid solution containing proteins, since the liquid will be above the freezing point of water.

If the thawing and infiltration steps are performed separately, the frozen hydrogel is first thawed, by just sitting in air or liquid with a temperature between the melting point of water (~0° C.) to the melting point of the hydrocolloid (~85° C.). The infiltrating step can be done at any temperature between the freezing point of the protein solution (~0° C.) to the onset gelation temperature of the protein (~45° C. but dependent on the protein).

The amount of protein loading, and any other constituents or supplements, is controlled by varying the selected period of time that the textured hydrogel is immersed in the solution containing the ingestible soluble protein and other constituents in order to vary the amount of protein and other constituents loaded into the textured hydrogel in a time dependent manner. The amount of protein loading can also be changed by the protein concentration in the immersion liquid as well as the ratio in weight or volume between the frozen hydrogel and the immersion liquid in which it is placed. An upper limit on the amount of protein that may be present would be the solubility limit of the protein.

In embodiments where the ingestible polysaccharide containing hydrogel is a K-carrageenan hydrogel, specific ions may be included in the ingestible soluble protein containing solution or in the interior of the hydrogel (or both) for mitigating swelling and shrinkage in a concentration dependent manner and increasing stiffness of the K-carrageenan gels compared to the stiffness in the absence of ions, and for preserving fiber the fibrous hydrogel formation in the directionally frozen K-carrageenan gels upon extended storage.

Ratios of Ingestible Protein to Hydrocolloids

In the fibrous meat analog food product, in an embodiment the proteins are present in a range from about 5 wt. % to about 35 wt. % and the hydrocolloid is present in a range from about 0.2 wt. % to about 10 wt. %, so that the range in the ratio protein:hydrocolloid is from about 35:0.2 to about 5:10, or 175 to 0.5, (50-17500%).

In a more preferred embodiment, the protein is present in a range from about 10 wt. % to about 30 wt. % and the hydrocolloid is present in a range from about 0.5 wt. % to about 8 wt. %, so that the range in the ratio of protein:hydrocolloid is from about 30:0.5 to about 10:8, or 60 to 1.25, (125-6000%).

In a most preferred embodiment, the protein is present in a range from about 10 wt. % to about 20 wt. % and the hydrocolloid is present in a range from about 1 wt. % to about 5 wt. %, so that the range in the ratio protein:hydrocolloid is from about 20:1 to about 10:5, or about 20 to about 2, (200-2000%).

Ratios of Gellable Proteins to Non-Gellable Proteins

In some embodiments the ingestible gellable proteins are a mixture of ingestible gellable proteins of which at least some, but not all, are heat gellable. The total amount of the ingestible proteins can be present in a range from about 5 wt. % to about 35 wt. %, and the hydrocolloid can be present in a range from about 0.2 wt. % to about 10 wt. % in the fibrous meat analog food product. In a more preferred embodiment the total amount of ingestible proteins are present in a range from about 10 wt. % to about 30 wt. % and the hydrocolloid is present in a range from about 0.5 wt. % to about 8 wt. % in the fibrous meat analog food product. In a most preferred embodiment the ingestible proteins are present in a range from about 10 wt. % to about 20 wt. % and the hydrocolloid is present in a range from about 1 wt. % to about 5 wt. % in the fibrous meat analog food product.

For the mixture of heat gellable and non-heat gellable proteins the minimum amount of heat gellable protein to create a good gel is about 5 wt. % and the maximum is 35 wt. %, and with the maximum total protein being about 35 wt. %, then the maximum non-heat gelling protein is about 30 wt. %, therefore the ratio non-gelling:gelling is about 30:5 to about 0:35, equal to 6 to 0 i.e. up to 6.

For the mixture of heat gellable and non-heat gellable proteins the intermediate amount of heat gellable protein to create a good gel is about 8 wt. % and the maximum is 25 wt. %, and the maximum total protein is 35 wt. %, then the maximum non-heat gelling protein is 27 wt. %, so that the ratio non-gelling:gelling is 27:8 to 0:25=~3.5 to 0, i.e. up to 3.5.

For the mixture of heat gellable and non-heat gellable proteins the commercially viable minimum amount of heat gellable protein to create a good gel is about 10 wt. % and the maximum is 20 wt. %, and the maximum total protein present is 30 wt. %, the maximum non-heat gelling protein is 20 wt. %, so that the ratio non-heat gelling protein:heat gelling protein is 20:10 to 0:20=2 to 0, i.e. up to 2.

When the hydrogel is a K-carrageenan hydrogel it preferably has a concentration range from about 0.1 wt. % to about 15 wt %. Similarly, when the hydrogel is an agar hydrogel it preferably has a concentration in a range from about 0.1 wt. % to about 15 wt %. This results in a modulus from about 100 to 5000 Pascals. Non-limiting examples of further constituents or supplements includes any one or combination of flavors, tastants, emulsifiers, preservatives, colors and texture modifiers. Additional supplements may include emulsions of any one or combination of omega-3, omega-6, omega-9 fatty acids. With regard to omega-3 supplements, preferred modes would use omega 3 fatty acids predominantly in the form of fatty acids esters such as, but not limited to, triglycerides. Examples of ingestible supplements include water-soluble vitamins including ascorbic acid (vitamin C), thiamin, riboflavin, niacin, vitamin B6 (pyridoxine, pyridoxal, and pyridoxamine), folacin, vitamin B12, biotin, and pantothenic acid. Water insoluble vitamins may also be included, including any one or combination of vitamins A, D, E and K. Ingestible minerals may be included, including anyone or combination of iron, magnesium, manganese, zinc and calcium. Other ingestible supplements include anti-oxidants, such as, but not limited to, tocopherols.

The heat treated, protein (and optionally) the other supplements or additives infiltrated into the textured hydrogel may be packaged and stored at temperatures in a range from about 4° C. to about 7° C. but they may be stored in a wider range of temperatures.

It will be appreciated that different proteins may be infiltrated into the thawed hydrogel. For example, water soluble heat induced gelling proteins from non-animal sources with or without a water-soluble non-gelling protein may be used. The water-soluble heat induced protein could be various plant proteins such as canola, rubisco (various sources such as duck weed/water lentil), potato, or animal proteins expressed in non-animal hosts such as gelatin, beta-lactoglobulin or ovalbumin. The water-soluble non-gelling protein could be hydrolyzed proteins of various types including those from legumes, wheat or algae. There may also be the possibility of adding a soluble heat gelling non-protein polymer such as hydroxy propyl methyl cellulose, methyl cellulose or curdlan.

Pre-Cooking the Food Product

Heating the protein containing fibrous meat analog food product up to a temperature in the range from about 50° C. to about 60° C. is advantageous in that it provides enough gelling which stops noticeable water leakage that occurs after protein infusion while maintaining the 'raw' appearance of the product. This product can then be packaged and shipped to outlets selling the product such as grocery stores and the like. In this form, once purchased, the consumer would cook it above 60° C., with the cooking temperature being dependent on the particular type of food product. To achieve the desired meat or fish analogs, they will be produced using different proteins/ingredients for different products with different heating profiles since each type of meat has different texture, and therefore altering ingredients and processing methods will be needed to emulate each food product properly so that the heating parameters may change to seal the moisture in. Once in the consumers' hands, since the different food products will have different proteins, protein levels, hydrocolloids etc., the final cooking temperature will vary depending on the food product.

On the other hand, in another embodiment, it may be desirable to actually cook the product through after production and sell the product as a "pre-cooked" meal. For example, pre-cooked and ready to eat food analogs can be readily sold to militaries as ready to eat meals where it is not tactically advisable to be cooking a meal in the field. Similar logic applies to disaster relief situations where meals pre-cooked are in demand.

Composite Hybrid Hydrocolloid Gels

Producing a hybrid hydrocolloid gel followed by directional freezing has been observed by the inventors to improve texture and heat stability. Some hydrocolloids from which the hydrocolloid gel is produced can be prone to disintegration upon cooking before the proteins gel, and/or can lead to a loss of fibrousness. Blending two or more hydrocolloids together to produce the hydrocolloid gel can solve this issue.

The composite hydrocolloids will be illustrated using the non-limiting example of a composite produced using alginate mixed with agar (and which were compared to pure alginate and agar) but it will be understood that with the availability of numerous hydrocolloids there are many possible composites, and the composites are not limited to being produced from only two different hydrocolloids.

Example

Three samples were prepared, the first being pure agar, the second being pure alginate, and the third being a composite formed from alginate mixed with agar. For the latter, alginate was mixed with deionized water until dissolved, after which agar powder was added and the mixture was heated to 85° C. and held at this temperature for about 20 minutes while stirring to dissolve the agar. Upon dissolution, the temperature was lowered to 60° C. and $CaCO_3$ was dispersed for about 20 minutes. Gluconolactone (GDL) was dissolved into the mixture for 5 minutes at 60° C. while actively mixing (using for example a magnetic stirrer), after which the sample was placed in a sonic water bath to remove air bubbles. The resulting viscous composite is then added, at a temperature of about 50° C. to cylindrical molds on the cold plate (held at a temperature of about −15° C. to directionally freeze the composite gel. Upon being fully directionally frozen, the directionally frozen product is kept frozen at about −18° C. for about 24 hours, which was determined to improve the integrity of the fibrous structure.

The pure agar sample was about 2 wt. % agar, and the pure alginate sample was about 0.5 wt. % alginate. The composite comprised about 2 wt. % agar+about 0.5 to about 0.75 wt. % Na-Alginate. All samples contained $CaCO_3$ (0.17 to about 0.225 wt. %) and GDL (about 0.6 to about 0.8 wt. %). The samples are then placed in a protein solution containing 12 wt. % potato protein, 50 mM NaCl, and about 0.1 wt. % colorant overnight at 4° C. to melt the ice crystals and infuse the protein solution into the directionally frozen structure. The next day, the samples were heated at 55° C. for 20 minutes in a beaker glass placed in a water bath.

Figure 7A:
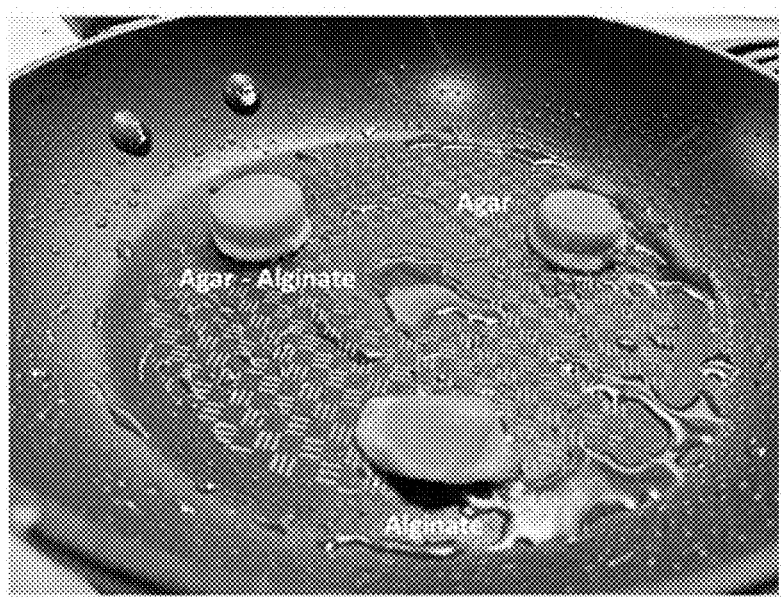
FIG. 7A is an optical photograph showing the appearance during frying of agar, alginate and the agar-alginate composite gel.

Comparison of the pure agar, pure alginate the and agar/alginate composite gel after immersion protein solution are as follows. Both the agar and the agar-alginate gel were relatively firm gels, whereas the alginate gel was relatively soft. The potato protein loaded composite agar-alginate gel was slightly larger than the potato protein loaded agar gel, the latter appearing to have shrunk more than the former. After heat treatment at about 55° C., the samples were noticeably lighter and firmer. The protein loaded gels were placed in the same frying pan for the same duration to test the frying performance at the same temperature (see FIG. 7A). The agar-alginate mixed gel kept its shape better while heating, whereas the agar gel and alginate gel shrunk considerably.

Figure 7B:
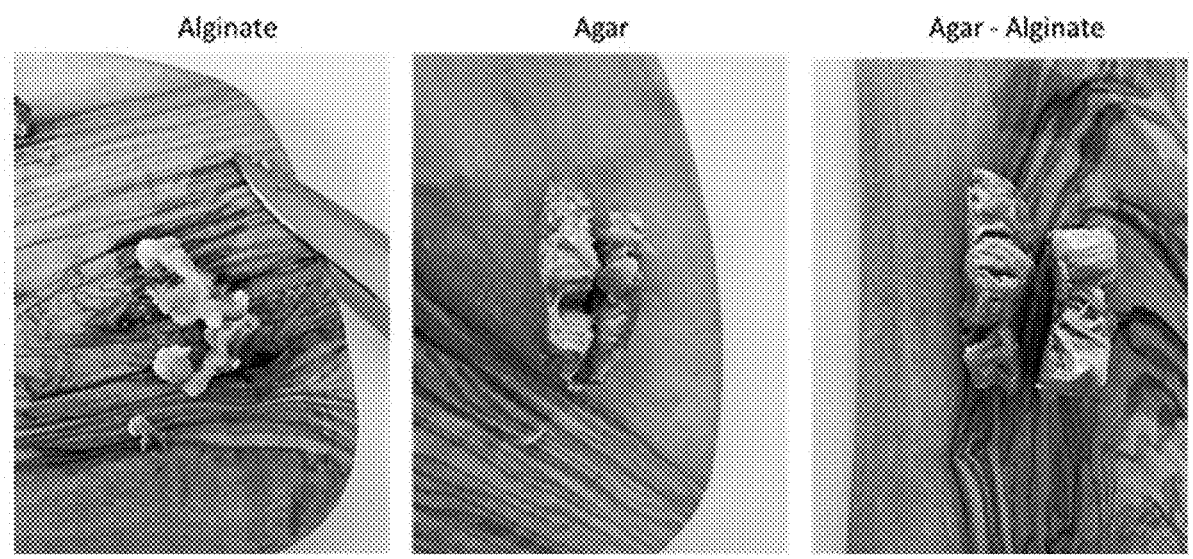
FIG. 7B is an optical photograph showing the structure of the alginate, agar, and the agar-alginate composite gel after frying.

After frying, the samples were placed on a cutting board and the difference between the agar and the agar-alginate hybrid was again observed (see FIG. 7B): the protein loaded composite agar-alginate gel retained its shape better than either the agar or alginate alone. Also, in the cross-section, the protein loaded composite agar-alginate gel showed a more appealing structure than the protein loaded gels made with the individual hydrocolloids. It shows that addition of the alginate (to agar) results in a gel that has better heat resistance than agar alone, resulting in a more stable structure when heated in a frying pan with retention of the fibrous structure.

Figure 3A:
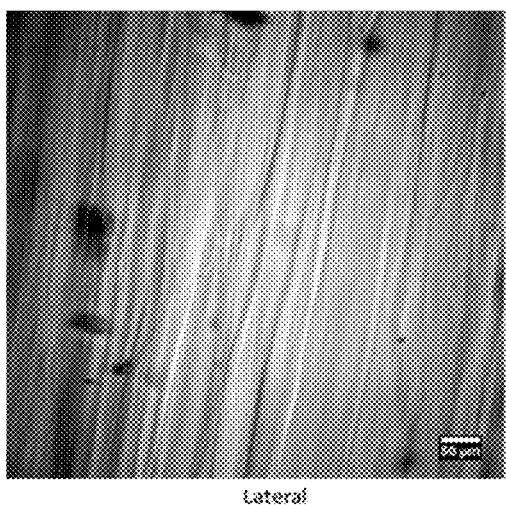
FIG. 3A is a micrograph showing the lateral view of the elongated channels within an agar-alginate hybrid gel after directional freezing using a light microscope.
Figure 3B:
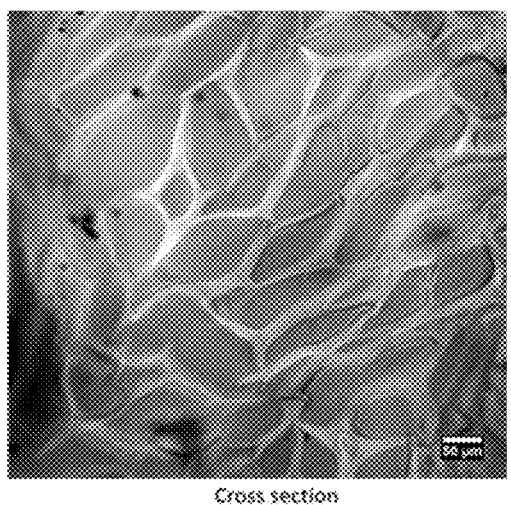
FIG. 3B is a micrograph showing the cross-sectional view of the elongated channels within an agar-alginate hybrid gel after directional freezing using a light microscope.
Figure 3C:
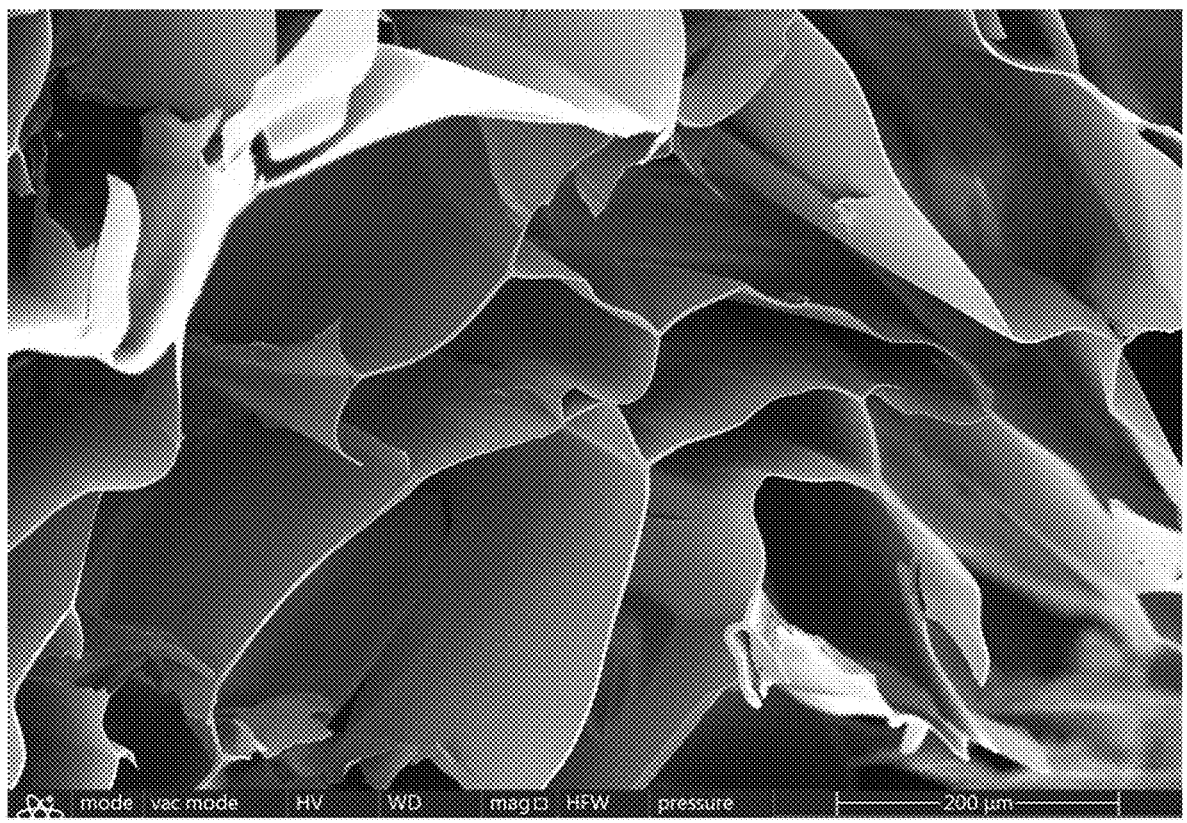
FIG. 3C is a scanning electron microscopy image showing the cross-sectional view of the elongated structures in an agar gel after directional freezing and subsequent freeze drying. The ice in the elongated channels in this image are removed by the freeze drying process.

The directionally frozen agar-alginate hybrid gel was imaged (prior to protein loading) using a light microscope. Photos show the aligned elongated channels (lateral) as well as a cross section. In FIG. 3A it can be seen that the channels in the polymer gel are mostly uninterrupted, leading to channels of several 100$s$ of microns long and therefore a template for a fibrous structure. The cross section (FIG. 3B) reveals that the channels are about 50 to about 200 microns in diameter, slightly elongated, intersected by the high density 'lamellae' of the polysaccharide.

These results show that composite or hybrid gels can advantageously improve certain product characteristics compared to non-composites produced from a single hydrocolloid. It will be appreciated that composites could be prepared from more than two starting components. It will be appreciated that the present composites are not limited to alginate and agar, and in fact many such combinations are possible.

Building a Larger/More Complex Macrostructure

More complex fibrous meat analog food products are produced by creating a complex macrostructure via a stacking process that creates multiple layers of hydrocolloid/hybrid hydrocolloid/protein plus hydrocolloid gel, each separated by a thinner interstitial layer using protein/starch/hydrocolloid/oil-in-water (O1W) emulsion/solid particles (examples being titanium dioxide, protein, calcium carbonate, starch)/combination of any of these, emulating the connective tissue of meats/fish.

In this process, a desired number of hydrogels are prepared that are to be included in the stacked structure, the steps include preparing an interstitial layer made of materials selected to emulate connective tissue of meats and/or fish, applying the interstitial material to a surface of one of the first of the hydrocolloid gels, placing a second hydrocolloid gel on top of the interstitial layer, and repeating until the desired number of separate hydrocolloid gels have been stacked together. Typically, the thicknesses of the interstitial layers will be of the same thickness but it will be appreciated that they do not all need to have the same thickness.

Example

The gel was created by pouring alternate layers of agar and an agar-protein mixture. Both solutions were prepared separately, heated to 85° C. for 15 minutes, and cooled down to 70° C. The solutions were poured into a vessel to create layers of about 0.25 cm to about 2 cm. In between pouring each layer, the temperature of the previous layer was allowed to cool down for about 60 seconds for thin layers, to 120 seconds for thicker layers, thereby increasing the solutions' viscosities and preventing layers from mixing upon pouring. In this instance, the optimal temperature of each layer was found to be about 42° C.

The resulting layer structure was left at 4° C. overnight to complete gelation of the interstitial layers. Following this the macrostructure was directionally frozen all at once following which the directionally frozen macrostructure was subsequently infused with protein by for example, but not limited to, thawing of the directionally frozen stacked structure in a protein solution as described previously. The protein disperses across all of the hydrogel layers in the stack, despite the interstitial layers of a different formulation.

Non-limiting examples of hydrocolloid gel layers include using alternating layers of hydrocolloid gel; one to make the myotome (muscle fibers) and the other to make the myocommata (white interstitial connective tissue).

Figures 4A, 4B:
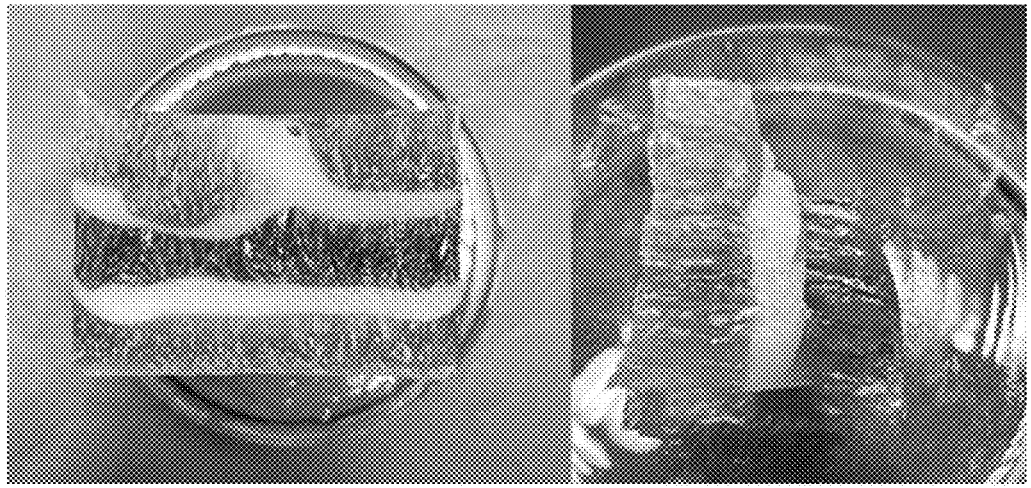
FIG. 4A is an optical photograph showing the cross section of a layered, directionally frozen gel where the alternating layers are fibrous or non-fibrous.
FIG. 4B is an optical photograph showing the cross section of another layered, directionally frozen gel where the alternating layers are fibrous or non-fibrous similar to FIG. 4A.
Figure 4C:
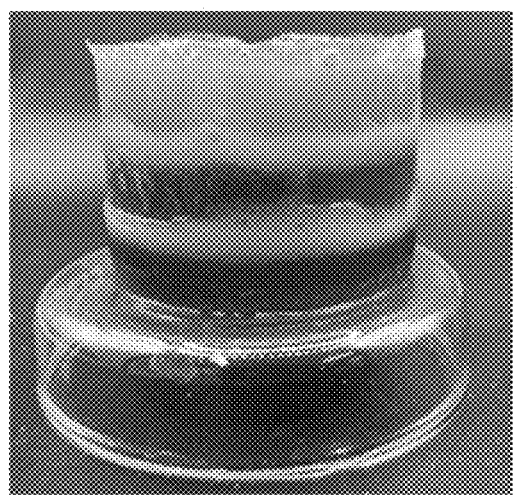
FIG. 4C is an optical photograph showing the side view of another layered, directionally frozen gel where the alternating layers are fibrous or non-fibrous similar to FIG. 4A.

After directional freezing, the layers can have an alternating fibrous/non fibrous character throughout the structure such as by incorporating particulate matter, such as protein particles, into the interstitial layer which affects the ability to form fibers negatively (as seen in FIGS. 4A and 4B). Thus, it is possible to control the fibrous nature of the stacked product. In the resulting stacked product the various gel layers adhere to each other (as shown in FIG. 4C), but break off of each other under stress before the fibrous layers break within, emulating a "flakey" texture.

Figure 5A:
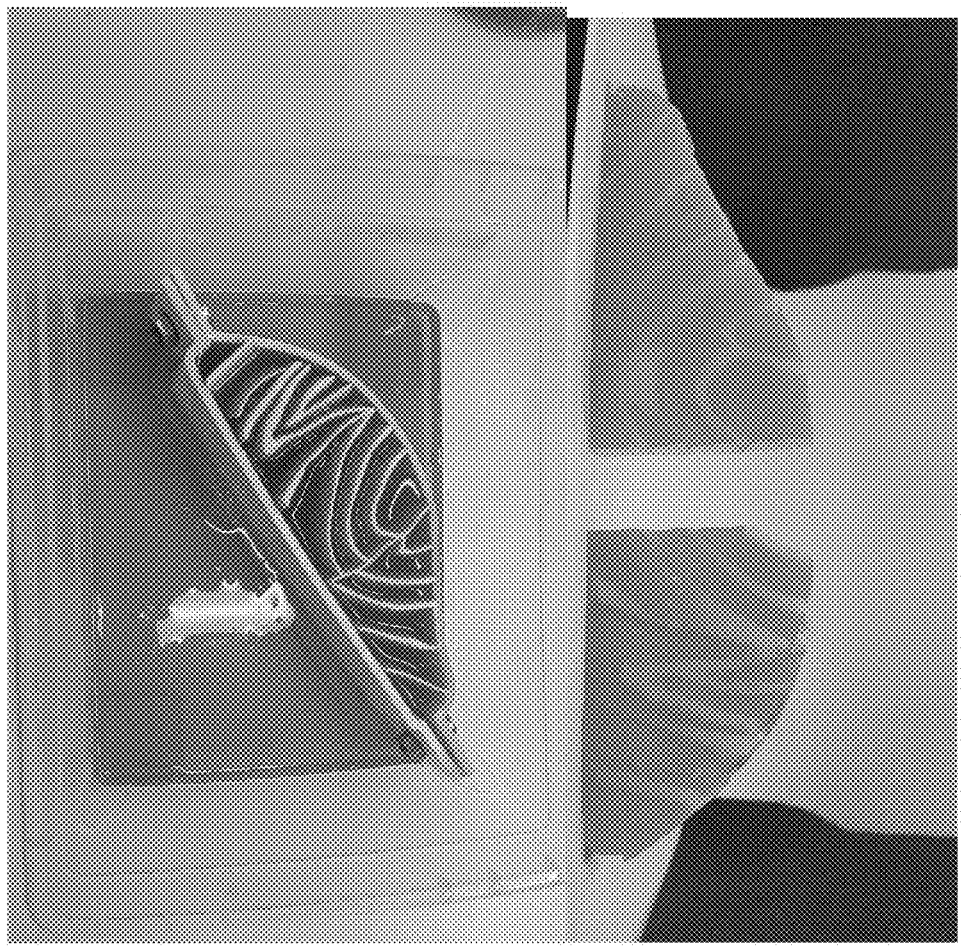
FIG. 5A is an optical photograph showing 3 wt. % agar with 0.15 wt. % colorant in the salmon mold. The picture on the right shows the final result after the myocommata has been added.
Figure 5B:
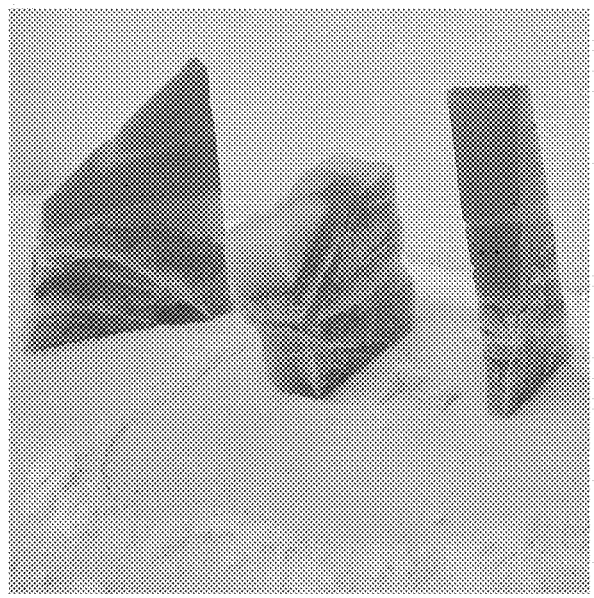
FIG. 5B is an optical photograph showing the myotome-myocomata gel cut-up into pieces and directionally frozen at −15° C.
Figure 5C:
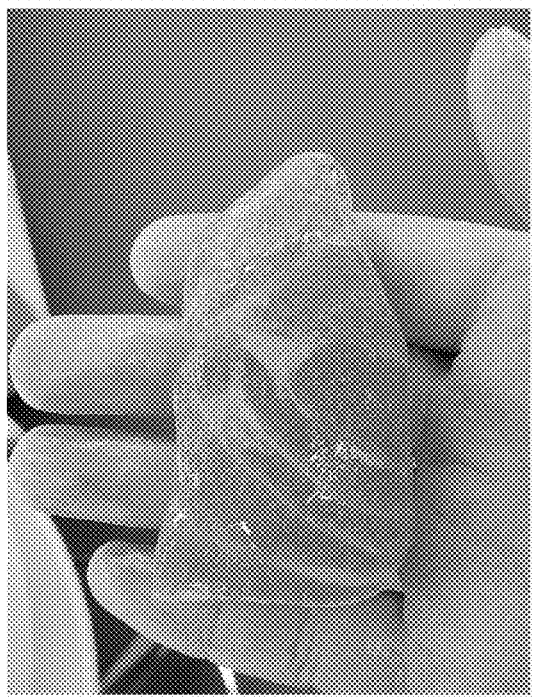
FIG. 5C is an optical photograph showing a piece of the myotome-myocomata gel right after being directionally frozen.

A variation of this can involve using a mold (see FIGS. 5A, 5B and 5C), possibly 3D printed, that emulates the visual form of a whole cut of meat or fish, with space/dividers where the connective tissue/fat layers are located. The hydrocolloid gels are added to the mold followed by setting of gel, after which it is removed from the mold. Once removed, the spaces or gaps in the superstructure where the connective tissue/fat layer dividers were located are filled in the spaces with a liquid form of the connective tissue formulation and upon setting of the connective tissue formation gel, a single macrostructure is produced. This macrostructure is then directionally frozen, and subsequently infused with protein, as by any of the processes described previously. Various additives may be added, such as lipids and other flavor components via the interstitial layers, possibly via an oil-in-water (O/W) emulsion, and/or through the main gel layers.

Process for Producing Meat or Fish Analogs with Different Textures by Directionally Freezing a Protein Gel Various food analog products with differing textures can be produced using a protein gel (rather than a hydrocolloid gel), and subsequently directionally freezing it as disclosed previously. This still produces protein fibers, yet with a different texture achieved using the hydrocolloid gels. All other steps of producing the final food product are the same as for the hydrocolloid gels discussed above.

Example

Figure 7C:
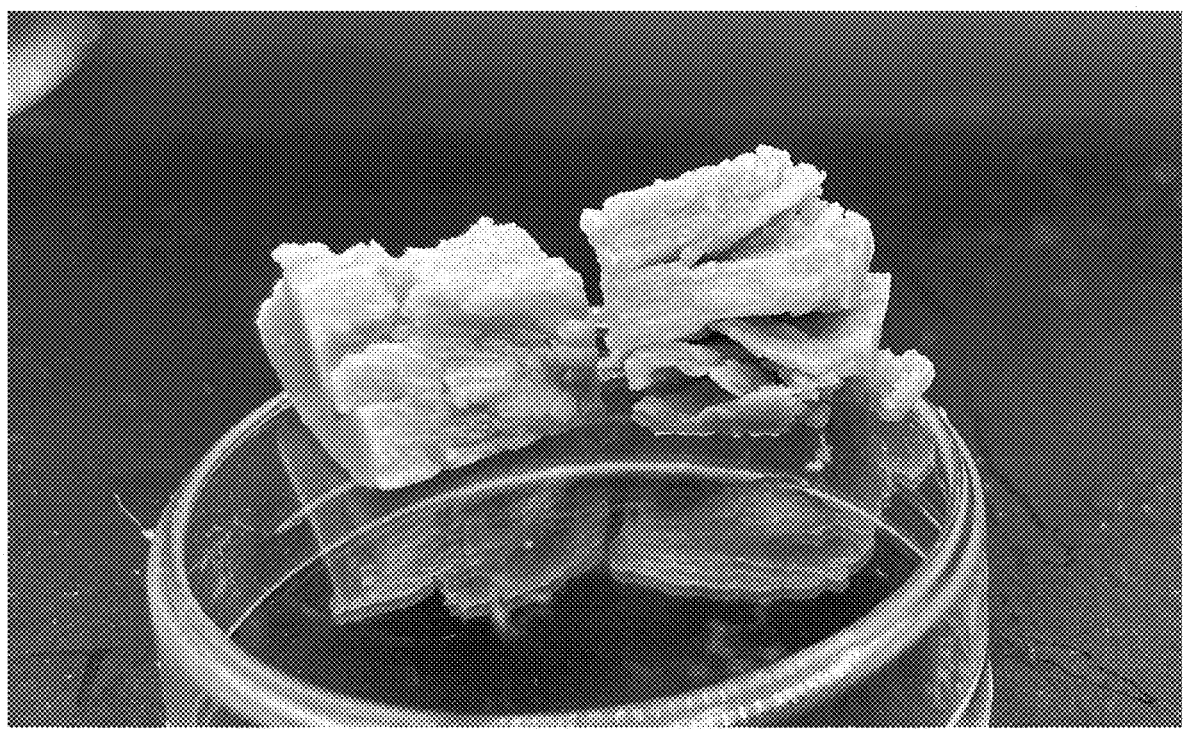
FIG. 7C is an optical photograph showing the appearance of a 12 wt % potato protein gel after directional freezing.

A heat-set gel (protein gels made by heating a solution of heat-gellable protein) was produced by heating a solution of 12 wt. % protein, 50 mM NaCl, pH7 at about 80° C. for about 30 minutes. The sample was cooled in the fridge to about 4° C. The protein gel was directionally frozen until it was fully frozen after which it was left at room temperature to defrost. After thawing, a fibrous/flakey structure was observed (as seen in FIG. 7C). The proteins which may be used to produce the protein gel includes, but are not limited to, any one or combination of whey protein, soy protein, potato protein, rubisco protein, lemna protein, rice protein, almond protein, egg protein, oat protein, flax seed protein, euglena protein, schizochytrium protein, mung bean protein, pea protein, recombinant mammalian whey, cultured mammalian whey, recombinant egg albumin, cultured egg albumin, recombinant gelatin or collagen, cultured gelatin or collagen, canola protein, lupin protein, fava protein, wheat protein, lentil protein, amaranth protein, peanut protein, moranga seed protein, pumpkin seed protein, chickpea protein, sunflower seed protein, safflower seed protein, mustard seed protein, chlorella protein and spirulina protein.

Directionally Freezing a Solution of a Single or mixture of Biopolymers and infusing it with a Single or Mixture of Biopolymers Those skilled in the art will appreciate that the first biopolymer solution can be a hydrocolloid solution, a protein solution, or a mixed protein hydrocolloid solution. The second biopolymer solution can be a hydrocolloid solution, a protein solution, or a mixed protein hydrocolloid solution.

Process for Producing meat or Fish Analogs with Different Textures by Directionally Freezing a Solution Containing both Protein and Hydrocolloid A composite comprised of a hydrocolloid and a protein can be produced and subjected to directional freezing. The resulting composite food analog forms a more fibrous texture than the pure protein infused protein gel or the protein infused hydrocolloid gels. Directional freezing can be followed by replacement of the aligned elongated ice crystals with protein using any of the methods described previously.

Figure 8:
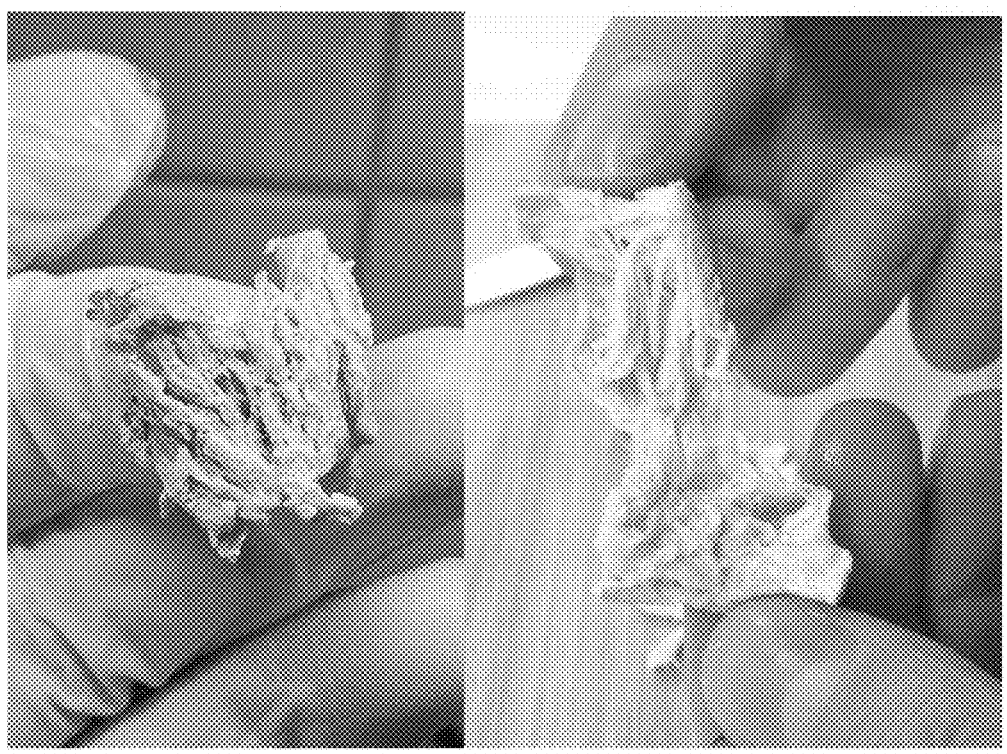
FIG. 8 is an optical photograph showing the fibrous appearance of a 15 wt % canola-potato protein sodium alginate gel after being directionally frozen and cooked with it being shown intact on the left panel and being pulled apart in the right hand panel.

Example hi this example, a gel is produced using a blend of canola and potato protein, sodium alginate, $CaCO_3$; and GDL. A protein solution of 20 wt. % is prepared and stored overnight at 4° C., Sodium alginate is dissolved in the solution at a concentration of 1 wt. %. The equivalent of 15 mM of $CaCO_3$ is dispersed in the solution for 20 minutes, followed by the dissolution of the equivalent of 30 mM of GDL for 5 minutes. The mixture is then degassed for 5 minutes in an ultrasonic bath and poured onto a mold on a cold plate at −15° C. Once fully frozen, the sample is stored at −18° C. for 24 hours, then thawed at 4° C. for 24 hours. The thawed, fibrous food analog product was subsequently cooked, yielding a texture visually approximating chicken (FIG. 8).

Directionally Freezing a Gel of a Single or Mixture of Biopolymers and Infusing it with a Single or Mixture of Biopolymers Those skilled in the art will appreciate that the biopolymer gel can be a hydrocolloid gel, a protein gel, or a mixed protein hydrocolloid gel. The biopolymer solution can be a hydrocolloid solution, a protein solution, or a mixed protein hydrocolloid solution.

Process for Producing Meat or Fish Analogs with Different Textures by directionally Freezing a Gel containing both Protein and Hydrocolloid A composite comprised of a hydrocolloid and a protein can be produced and subjected to directional freezing. The resulting composite food analog forms a fibrous texture distinct from a pure protein infused protein gel or the protein infused hydrocolloid gels. Directional freezing can be followed by replacement of the aligned elongated ice crystals with protein using any of the methods described previously.

Example

In this example, a gel is produced by mixing a 20 wt. % hydrolyzed rice protein solution with a 4 wt. % agar solution in a 1:1 ratio at 85° C. The homogeneous mixture is cooled down, causing it to gel, and directionally frozen. The gel was then placed in a protein solution containing 12 wt. % potato protein, 50 mM NaCl, and about 0.1 wt. % colorant overnight at 4° C. to melt the ice crystals and infuse the protein solution into the directionally frozen structure. The next day, the samples were heated at about 55° C. for about 20 minutes in a glass beaker placed in a water bath. The result was a product with a fibrous structure.

Production of Skin Layer

Figure 6:
FIG. 6 is an optical photograph showing stacked 3 wt. % agar myotome gels with myocommata layers made of 5 wt. % mung bean and 3 wt. % agar topped with the alginate-seaweed based skin.

After production of the fibrous meat analog food product, an algae-hydrocolloid composite film that resembles a layer of animal/fish skin may be produced by immersing a sheet of algae (e.g., nori) in an alginate solution or alginate-oil emulsion (see FIG. 6), layering this onto the fibrous meat analog food product, gelling the alginate solution followed by partially drying the resulting gel. A non-limiting method for gelling the mixture is immersing it in a 2 wt. % calcium chloride solution for about two (2) minutes. The product with skin can be packaged with the skin being either dry or moist. Either way the skin will become moist to some degree over time due to equilibration.

The above example of a skin layer produced from a mixture of an algae and alginate solution or alginate-oil emulsion is exemplary only and non-limiting. The skin layer can be made of many materials including plant proteins, carrageenan, furcellaran and Konjac to give a few examples.

Color Change

Figure 9:
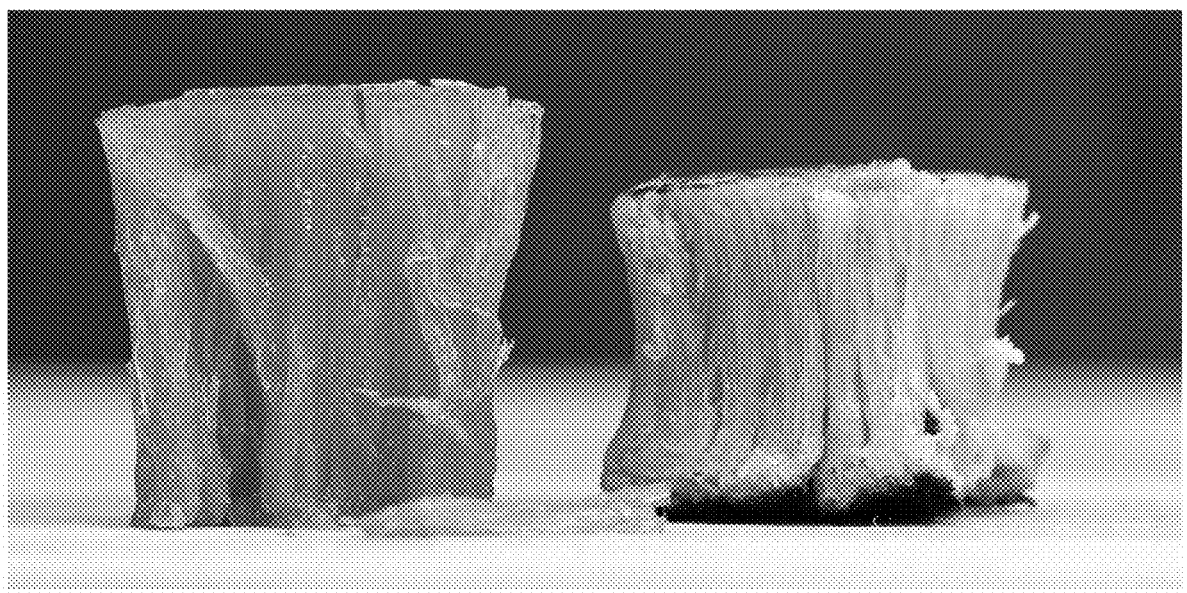
FIG. 9 is an optical photograph showing a 3 wt % agar, 0.75 wt % alginate hybrid gel after directional freezing and containing a 1:1 blend of canola:potato protein as well as colorant. The sample on the left was heated to 55° C. (resulting in a 'raw' appearance) and the sample on the right was subjected to a subsequent heat treatment in a frying pan (showing the cooked appearance).
Figure 10:
FIG. 10 Photograph showing a directionally frozen 0.75 wt % alginate, 7.5 wt. % whey, 3 wt. % potato protein composite gel during frying.
Figure 11:
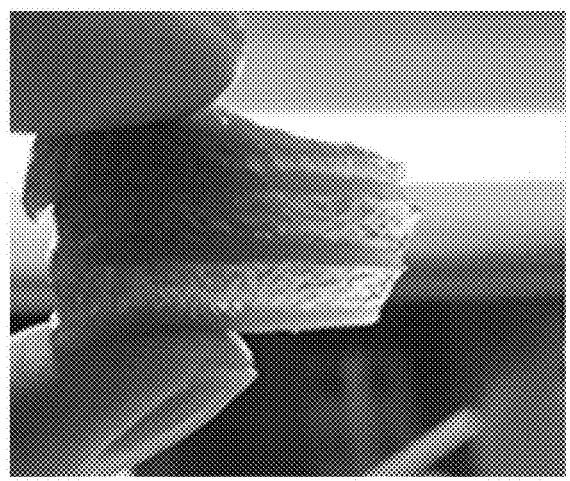
FIG. 11 is an optical photograph showing the side view of another layered, directionally frozen gel where the alternating layers are fibrous or non-fibrous similar to FIG. 4A, and the product is raw/uncooked and semi-translucent.

When the composition of the protein solution is optimized for color, there is a noticeable color and opacity change before and after heat treatment (i.e., from 'raw' to 'cooked') as shown in FIG. 9, improving the realistic appearance of a piece of meat-like material undergoing cooking. In this case the appearance before cooking is shown in the left image and after pan frying the fibrous gel undergoes shrinkage and increases in lightness, as shown in the right image. FIG. 10 shows that this improves the realistic appearance of a piece of meat-like material during pan frying. FIG. 11 showcases the product in an uncooked state, whereby it is translucent. The change in color and opacity occurs due to at least partial denaturation and subsequent aggregation of the proteins. The creation of aggregates larger than the wavelength of visible light causes scattering of light, resulting in a more opaque appearance. This color may undergo a chemical change during the cooking process further contributing to the same shift in appearance and/or opacity change.

Food Colorants

To obtain a fibrous meat analog food product having a final color looking like the meat product it is mimicking, various food colorants may be mixed in with the proteins so that this mixture replaces the elongated ice crystals. For example, to make an analog of salmon with the typical pink color of raw salmon the following colorants may be used, including, but not limited to, carotenoids, astaxanthin, lycopene, bixin, anthocyanins, safflor yellow, lutein, curcumin, capsanthin, capsorubin, norbixin, curcuminoids, turmeric, phycocyanins, melanoidins, and betalain. For beef, the following colorants may be used, but is not limited to, hemoglobin, myoglobin, anthocyanins, pomegranate juice extract, beet juice extract and betalain.

Raw Fibrous Meat Analogs

While production of fibrous meat analog food product has been described involving the step of gelling at least some of the proteins, it will be understood that "raw fibrous meat analogs may be produced for shipment in which none of the proteins are gelled upon production of the protein infused hydrocolloid. This process involves preparing an ingestible hydrocolloid gel comprised of one or more different ingestible hydrocolloids which is then subjected to directional freezing inducing formation of aligned elongated ice crystals to form a directionally frozen hydrocolloid gel with aligned elongated channels in which the aligned elongated ice crystals are located. The ice crystals are then replaced with ingestible proteins to produce a protein infused hydrocolloid gel. Following production of the protein infused hydrocolloid gel, an ingestible substance is introduced into the protein infused hydrocolloid gel that acts to prevent leakage of the protein from the protein infused hydrocolloid gel a raw fibrous meat analog food product. This raw fibrous meat analog food product is then packaged for shipment.

Non-limiting examples of ingestible substances that are introduced into the protein infused hydrocolloid gel to prevent leakage of the protein include pH, salt, heat treatment, chemical crosslinking, enzymatic crosslinking, infusion of a gelling hydrocolloid such as sodium alginate, curdlan, methyl cellulose, or applying a hydrocolloid coating such as a calcium gelled alginate solution.

The steps of replacing the aligned elongated ice crystals with ingestible proteins to produce a protein infused hydrocolloid gel and adding an ingestible substance into the protein infused hydrocolloid gel that acts to prevent leakage of the protein can be performed using the same steps discussed above for making the analog with some of the proteins gelled.

The end consumer will then cook the product for consumption, or alternatively, the fibrous meat analog food product may be designed to be eaten raw. A non-limiting example of such a raw fibrous meat analog food product include, but is not limited to sushi or other raw seafood product.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A process for producing fibrous meat analogs, comprising:
   a) preparing an ingestible biopolymer gel, solution, or dispersion comprised of one or more ingestible proteins and/or hydrocolloids, and water;
   b) subjecting the biopolymer gel, solution, or dispersion to directional freezing inducing formation of aligned elongated ice crystals to form a directionally frozen biopolymer gel, solution, or dispersion with aligned elongated channels in which the aligned elongated ice crystals are located;
   c) replacing the aligned elongated ice crystals with ingestible proteins and/or hydrocolloids to produce an infused gel; and
   d) subjecting the infused gel to a suitable condition to gel at least some of the ingestible proteins and/or hydrocolloids to create gelled proteins and/or hydrocolloids within the aligned channels to form a fibrous food product;
   wherein steps a) and/or c) comprise ingestible proteins.

2. The process according to claim 1, wherein the ingestible biopolymer gel, solution, or dispersion is:

(i) a hydrocolloid gel, solution or dispersion comprising one or more different ingestible hydrocolloids and water;
(ii) a protein gel, solution or dispersion comprising one or more different ingestible proteins and water; or
(iii) a composite gel, solution or dispersion comprising one or more different ingestible hydrocolloids and one or more different ingestible proteins; and water.

3. The process of according to claim 1, wherein the ingestible proteins and/or hydrocolloids of steps a) and c) are the same or different.

4. The process according to claim 1, wherein the ingestible hydrocolloids comprises one or more of regular and/or recombinant gelatin, agar, alginate, curdlan, kappa-carrageenan, kappa 2-carrageenan and iota-carrageenan, furcelleran, starch, modified starch, seaweed extract, dextrins, konjac glucomannan, methylcellulose, pectin, gellan gum, xanthan gum, guar gum, locust bean gum, gum Arabic, tara gum, or a polysaccharide.

5. The process according to claim 1, comprising:
a) preparing an ingestible hydrocolloid gel comprised of one or more ingestible hydrocolloids and water;
b) subjecting the ingestible hydrocolloid gel to directional freezing inducing formation of aligned elongated ice crystals to form a directionally frozen hydrocolloid gel with aligned elongated channels in which the aligned elongated ice crystals are located;
c) replacing the aligned elongated ice crystals with ingestible proteins to produce a protein infused hydrocolloid gel; and
d) subjecting the protein infused hydrocolloid gel to the suitable condition to gel at least some of the ingestible proteins to create gelled proteins within the aligned channels.

6. The process according to claim 1, comprising:
a) preparing an ingestible protein gel comprised of one or more first ingestible proteins and water;
b) subjecting the ingestible protein gel to directional freezing inducing formation of aligned elongated ice crystals to form a directionally frozen protein gel with aligned channels in which the aligned elongated ice crystals are located;
c) replacing the aligned elongated ice crystals with second ingestible proteins to produce a protein infused protein gel; and
d) subjecting the protein infused protein gel to the suitable condition to gel at least some of the second ingestible proteins to create gelled proteins in the aligned channels.

7. The process according to claim 1, wherein the ingestible proteins comprise gellable proteins, non-gellable proteins, or combinations thereof.

8. The process according to claim 7, wherein the ingestible proteins comprise cultured proteins; animal proteins, such as recombinant animal proteins; plant proteins; bacterial proteins; fungal proteins, such as yeast protein; algae proteins; or combinations thereof.

9. The process according to claim 8, wherein the ingestible proteins are any one, or any combination, of mammalian whey proteins, caseins or caseinates; soy protein, potato protein, rubisco protein, *lemna* protein, rice protein, almond protein, egg protein, oat protein, flax seed protein, *euglena* protein, schizochytrium protein, mung bean protein, pea protein, recombinant mammalian whey, cultured mammalian whey, recombinant egg albumin, cultured egg albumin, recombinant gelatin or collagen, cultured gelatin or collagen, canola protein, lupin protein, fava protein, wheat protein, lentil protein, amaranth protein, peanut protein, moringa seed protein, pumpkin seed protein, chickpea protein, sunflower seed protein, safflower seed protein, mustard seed protein, *chlorella* protein and *spirulina* protein.

10. The process according to claim 1, wherein step c) comprise:
(i) thawing the directionally frozen biopolymer gel, solution, or dispersion by immersion in a solvent containing the ingestible proteins and/or hydrocolloids of step c) having a temperature suitable to melt the ice crystals;
(ii) freeze drying the directionally frozen biopolymer gel, solution, or dispersion to remove substantially all the water and then immersing the dried gel into a solution containing the ingestible proteins and/or hydrocolloids of step c);
(iii) evaporating the ice crystals and then immersing the dried gel into a solution containing the ingestible proteins and/or hydrocolloids of step c); or
(iv) subjecting one end of the infused gel under vacuum to extract the ice crystals and to pull the ingestible proteins and/or hydrocolloids of step c) into the aligned elongated channels from another end of the infused gel.

11. The process according to claim 1, wherein step c) comprise thawing the directionally frozen biopolymer gel, solution, or dispersion; and wherein the process comprise multiple cycles of directionally freezing and thawing.

12. The process according claim 1, further comprising controlling the diameter of the aligned elongated channels by controlling the temperature gradient across the material in order to alter the speed of the directional freezing process, and wherein a diameter of gelled proteins in the aligned elongated channels is proportional to the diameter of the aligned elongated channels.

13. The process according to claim 12, wherein the diameter of the aligned elongated channels are controlled to give elongated gelled proteins having a diameter in a range from about 20 to about 200 microns.

14. The process according to claim 1, wherein the suitable condition comprises:
(i) heat treating the infused gel, and wherein the ingestible proteins comprise at least a heat gellable protein;
(ii) infiltrating a salt or ions into the infused gel, the salt selected to induce gelation of said at least some of the ingestible proteins and/or hydrocolloids;
(iii) adjusting a pH of the infused gel to a value suitable to cause gelation of said at least some of the ingestible proteins and/or hydrocolloids;
(iv) infiltrating a solution containing a crosslinking agent into the infused gel, the crosslinking agent selected to induce gelation of said at least some of the ingestible proteins and/or hydrocolloids;
(v) pressure treating of the infused gel to induce gelation of said at least some of the ingestible proteins and/or hydrocolloids; and/or
(vi) irradiating the infused gel with radiation of suitable wavelength and intensity to induce crosslinking of the protein thereby inducing gelling of said at least some of the ingestible proteins.

15. The process according to claim 14, wherein infiltrating the salt comprises contacting the infused gel with a sufficient concentration of salt solution to allow gelation of said at least some of the ingestible proteins and/or hydrocolloids; and wherein the salt is any one of sulfate, citrate, chloride, carbonate, ascorbate, acetate, sorbate, lactate, tartrate, gluconate and phosphate salts of sodium (Na), potassium (K), calcium (Ca) and magnesium (Mg), and any combination thereof.

16. The process according to claim 14, wherein adjusting the pH of the infused gel comprises adding a food safe pH modifier comprising acetic acid, hydrochloric acid, ascorbic acid, malic acid, formic acid, lactic acid, tartaric acid, citric acid, gluconic acid, glucono-delta lactone, sodium hydroxide, potassium hydroxide, calcium hydroxide, or combinations thereof.

17. The process according to claim 14, wherein the crosslinking agent is a chemical cross-linking agent comprising glutaraldehyde, tannins, genipin, liquid smoke, or a combination thereof.

18. The process according to claim 14, wherein the crosslinking agent is an enzyme-based crosslinking agent, comprising transglutaminase (EC 2.3.2.13), sortase A (EC 3.4.22.70), tyrosinase (EC 1.14.18.1), Laccase (EC 1.10.3.2), peroxidase (EC 1.11.1.x), lysyl oxidase (EC 1.4.3.13), amine oxidase (EC 1.4.3.6), or a combination thereof.

19. The process according to claim 1, wherein the ingestible biopolymer gel, solution, or dispersion has multiple layers.

20. The process of claim 19, wherein alternating layers are made with same or different biopolymer or biopolymer blends.

21. The process of claim 19, further comprising producing a layer mimicking a skin layer of meat or fish by producing a mixture of an agar and alginate solution with an alginate-oil emulsion and gelling the mixture to produce a skin layer.

22. The process according to claim 1, further comprising producing a plurality of protein infused biopolymer gels each having a preselected thicknesses, and preparing an interstitial layer made of materials selected to emulate connective tissue of meats and/or fish.

23. The process of claim 22, wherein the plurality of protein infused biopolymer gels are stacked and adhered to the interstitial layer.

24. The process according to claim 22, wherein the interstitial layer comprise materials selected to emulate connective tissue of meats and/or fish comprises any one or a combination of protein, hydrocolloid, oil-in-water emulsion, solid particles, fats and oleogel.

25. The process according to claim 24, wherein the solid particles comprise any one or combination of titanium dioxide, protein, calcium carbonate, starch, solid fat crystals and algae.

26. The process according to claim 1, further comprising:
i) adding a colorant during preparation of the biopolymer gel, solution, or dispersion; or
ii) replacing the aligned elongated ice crystals with a mixture of the second ingestible proteins and/or hydrocolloids and the colorant;
wherein the colourant comprises carotenoids, beta-carotene, astaxanthin, lycopene, bixin, anthocyanins, betalain, hemoglobin, myoglobin, beet juice extract, safflor yellow, lutein, curcumin, capsanthin, capsorubin, norbixin, anthocyanins, curcuminoids, turmeric, phycocyanins, melanoidins, or combinations thereof.

27. A process for producing fibrous meat analogs, comprising:
subjecting an ingestible biopolymer gel to directional freezing inducing formation of aligned elongated ice crystals to form a directionally frozen biopolymer gel with aligned channels in which the aligned elongated ice crystals are located;
thawing the directionally frozen biopolymer gel with the aligned channels by immersing the frozen biopolymer in a solution containing at least one ingestible soluble heat gelling protein, thereby melting and replacing the aligned elongated ice crystals with the at least one ingestible soluble heat gelling protein at a temperature below the gelling temperature of the soluble heat gelling protein, to produce a protein infused biopolymer gel; and
heating the protein infused biopolymer gel at a temperature above the gelling temperature of the at least one ingestible soluble heat gelling protein to create protein fibers to form a fibrous meat analog food product.

28. The process according to claim 27, wherein the ingestible biopolymer gel is:
a) a hydrocolloid gel comprising one or more different ingestible hydrocolloids and water;
b) a protein gel comprising one or more different ingestible proteins and water; or
c) a composite gel comprising i) at least two different ingestible hydrocolloids, ii) at least two different ingestible proteins, or iii) one or more different ingestible hydrocolloids and one or more different ingestible proteins; and water.

29. The process according to claim 27, wherein the biopolymer gel comprises of one or more of a polysaccharide, regular and/or recombinant gelatin, agar, fermentation derived gelatin, alginate, curdlan, kappa-carrageenan, kappa 2-carrageenan and iota-carrageenan, furcelleran, starch, modified starch, dextrins, konjac glucomannan, pectin, methylcellulose, gellan gum, xanthan gum, guar gum, locust bean gum, gum arabic, and tara gum.

30. The process of claim 14, wherein the at least one ingestible soluble heat gelling protein comprises: i) an ingestible soluble heat gelling protein, wherein a concentration of the ingestible soluble heat gelling protein in the solution containing at least one ingestible soluble heat gelling protein is in a range from about 0.5 to about 30%; or ii) a mixture of ingestible soluble heat gelling protein and a non-heat gelling protein.

31. The process of claim 27, wherein the at least one ingestible soluble heat gelling protein comprises: i) an ingestible soluble heat gelling protein, wherein a concentration of the ingestible soluble heat gelling protein in the solution containing at least one ingestible soluble heat gelling protein is in a range from about 0.5 to about 30%; or ii) a mixture of ingestible soluble heat gelling protein and a non-heat gelling protein.

32. The process of claim 30, wherein the ingestible biopolymer gel has a melting temperature greater than the gelling temperature of the ingestible soluble heat gelling protein.

33. The process of claim 30, wherein the ingestible biopolymer gel has a melting temperature greater than the gelling temperature of the ingestible soluble heat gelling protein.

34. The process according to claim 10, wherein thawing the directionally frozen hydrocolloid gel includes adjusting the temperature of the solvent containing the ingestible gellable proteins to be in a range from the melting point of the solvent within the hydrocolloid gel to the melting point of the hydrocolloid gel, and wherein replacing the aligned elongated ice crystals with the ingestible proteins includes adjusting the temperature of the solvent containing the ingestible proteins to be in a range from the freezing point of the solvent containing the protein solution to a gelation onset denaturation temperature of said at least some of the ingestible proteins.

35. The process according to claim 27, wherein thawing the directionally frozen hydrocolloid gel includes adjusting the temperature of the solvent containing the ingestible gellable proteins to be in a range from the melting point of the solvent within the hydrocolloid gel to the melting point of the hydrocolloid gel, and wherein replacing the aligned elongated ice crystals with the ingestible proteins includes adjusting the temperature of the solvent containing the ingestible proteins to be in a range from the freezing point of the solvent containing the protein solution to a gelation onset denaturation temperature of said at least some of the ingestible proteins.

36. The process according to claim 34, wherein thawing the directionally frozen hydrocolloid gel is conducted between about 0° C. to about 85° C., preferably between about 0° C. to about 45° C.

37. The process according to claim 35, wherein thawing the directionally frozen hydrocolloid gel is conducted between about 0° C. to about 85° C., preferably between about 0° C. to about 45° C.

38. The process of claim 14, wherein the solution containing at least one ingestible soluble heat gelling protein further comprises an ingestible non-heat gelling protein, and a heat induced trigger agent to trigger gelling of the ingestible non-heat gelling protein as the temperature is raised.

39. The process of claim 27, wherein the solution containing at least one ingestible soluble heat gelling protein further comprises an ingestible non-heat gelling protein, and a heat induced trigger agent to trigger gelling of the ingestible non-heat gelling protein as the temperature is raised.

40. The process of claim 38, wherein the heat induced trigger agent comprises a salt, enzyme, pH modifier, or combination thereof, preferably an enzyme microencapsulated within a meltable coating.

41. The process of claim 39, wherein the heat induced trigger agent comprises a salt, enzyme, pH modifier, or combination thereof, preferably an enzyme microencapsulated within a meltable coating.

42. The process of claim 27, wherein the solution containing at least one ingestible soluble heat gelling protein comprises: an aqueous solution or aqueous dispersion.

43. The process of claim 10, wherein the solution containing the at least one ingestible soluble heat gelling protein has a temperature of about 1° C. to about 60° C.

44. The process of claim 27, wherein the solution containing the at least one ingestible soluble heat gelling protein has a temperature of about 1° C. to about 60° C.

45. The process of claim 27, comprising varying the immersion time of the frozen biopolymer to control protein loading.

46. The process of claim 45, comprising controlling protein loading by varying a volume ratio of the ingestible biopolymer gel and the solution containing the at least one ingestible soluble heat gelling protein.

47. The process of claim 27, wherein the step of directional freezing of the ingestible biopolymer gel is conducted by placing the ingestible biopolymer gel in contact with a pre-cooled substrate at a temperature of about minus 2° C. to about minus 196° C.

48. The process of claim 27, wherein the ingestible biopolymer gel is a kappa-carrageenan hydrogel having a modulus in a range from about 100 to about 5000 Pascals.

49. The process of claim 27, wherein the ingestible biopolymer gel is an agar hydrogel having an agar concentration in a range from about 0.1% to about 15 wt %.

50. The process of claim 27, wherein the solution containing at least one ingestible soluble heat gelling protein further includes ingestible supplements that diffuse into the aligned channels, wherein the ingestible supplements comprise: water-soluble vitamins, including ascorbic acid (vitamin C), thiamin, riboflavin, niacin, vitamin B6 (pyridoxine, pyridoxal, and pyridoxamine), folacin, vitamin B12, biotin, pantothenic acid, and combinations thereof; or emulsions of esters of omega-3, omega-6, omega-9 fatty acids or a combination thereof; ingestible minerals; and/or anti-oxidants.

51. The process of claim 42, wherein the aqueous solution or aqueous dispersion comprise: flavors, tastants, emulsifiers, preservatives, colors, pH modifiers, texture modifiers or a combination thereof.

52. The process of claim 27, wherein the step of subjecting the ingestible biopolymer gel to directional freezing and inducing formation of aligned elongated ice crystals, further comprises: placing the ingestible biopolymer gel in contact with a pre-cooled substrate to give directional freezing in one direction; or placing the ingestible biopolymer gel between two pre-cooled substrates, wherein the directional freezing proceeds from opposite directions.

53. The process of claim 30, wherein in the mixture of heat gelling protein and a non-heat gelling protein, a concentration of the ingestible heat gelling protein in the solution containing at least one ingestible soluble heat gelling protein is in a range from about 2 to about 10 wt %, preferably about 2 to about 15%, more preferably about 2 to about 20% with the remainder being non-heat gelling protein to make up to a total of 25 wt % of the protein mixture.

54. The process of claim 31, wherein in the mixture of heat gelling protein and a non-heat gelling protein, a concentration of the ingestible heat gelling protein in the solution containing at least one ingestible soluble heat gelling protein is in a range from about 2 to about 10 wt %, preferably about 2 to about 15%, more preferably about 2 to about 20% with the remainder being non-heat gelling protein to make up to a total of 25 wt % of the protein mixture.

55. The process of claim 14, wherein the step of heat treating the ingestible soluble heat gelling protein infused biopolymer gel is conducted at a solution temperature in a range from about 40° C. to about 150° C.

56. The process of claim 27, wherein the step of heat treating the ingestible soluble heat gelling protein infused biopolymer gel is conducted at a solution temperature in a range from about 40° C. to about 150° C.

57. The process of claim 1, further exposing the infused gel to an agent that acts to prevent leakage of protein from the infused gel, wherein said agent comprises any one or combination of a pH modifier, salt, heat treatment, chemical crosslinking agents, enzymatic crosslinking agents, infusion of a gelling hydrocolloid, and applying a hydrocolloid coating to said protein infused hydrocolloid gel.

58. The process of claim 27, further exposing the infused gel to an agent that acts to prevent leakage of protein from the infused gel, wherein said agent comprises any one or combination of a pH modifier, salt, heat treatment, chemical crosslinking agents, enzymatic crosslinking agents, infusion of a gelling hydrocolloid, and applying a hydrocolloid coating to said protein infused hydrocolloid gel.

59. The process according to claim 1, wherein the step of replacing the aligned elongated ice crystals further comprises replacing with tastents and/or colorants.

60. The process according to claim 27, wherein the step of replacing the aligned elongated ice crystals further comprises replacing with tastents and/or colorants.

61. A fibrous meat analog food product produced by the process claim 1.

62. A fibrous meat analog food product produced by the process of claim 27.

63. The food product according to claim 61, being a fibrous mammalian meat, poultry or seafood analog food product.

64. The food product according to claim 61, wherein the ingestible proteins are present in a range from about 2 wt. % to about 50 wt. %, preferably from about 5 wt. % to about 50 wt. %, preferably from about 5 wt. % to about 35 wt. %, preferably from about 10 wt. % to about 30 wt. %, preferably from about 15 wt. % to about 25 wt. %, preferably from about 10 wt. % to about 20 wt. % in the food product.

65. The food product according to claim 61, wherein the hydrocolloid is present in a range from about 0.2 wt. % to about 10 wt. %, preferably about 0.5 wt. % to about 8 wt. %, preferably about 0.5 wt. % to about 5 wt. % in the food product.

66. The food product according to claim 61, wherein the ingestible proteins comprise a mixture of ingestible heat-gellable proteins and non-gellable proteins to give added protein content.

67. The food product according to claim 66, wherein a maximum amount of protein present is 25 wt. %, then a minimum amount of ingestible heat gellable protein in the mixture is 2 wt. %, and a maximum amount of non-heat gellable protein is 23 wt. %.

68. The food product according to claim 66, wherein a maximum amount of protein present is 25 wt. %, and an intermediate minimum amount of ingestible heat gellable protein in the mixture is about 8 wt. %, and a maximum amount of non-heat gellable protein is about 17 wt. %.

69. The food product according to claim 66, wherein a maximum amount of protein present is 25 wt. %, and an intermediate minimum amount of ingestible heat gellable protein in the mixture is about 10 wt. %, and a maximum amount of non-heat gellable protein is about 15 wt. %.

* * * * *